US012631437B2

(12) United States Patent　　(10) Patent No.:　US 12,631,437 B2
Iizuka et al.　　(45) Date of Patent:　May 19, 2026

(54) SENSOR UNIT AND SENSOR UNIT ATTACHMENT METHOD

(71) Applicant: Murata Manufacturing Co., Ltd., Kyoto (JP)

(72) Inventors: Takehiko Iizuka, Kyoto (JP); Nobuyuki Nozawa, Kyoto (JP); Tomoshige Furuhi, Kyoto (JP); Koji Kawano, Kyoto (JP); Takashi Watanabe, Kyoto (JP); Jun Makino, Kyoto (JP); Kenta Ago, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 386 days.

(21) Appl. No.: 18/505,560

(22) Filed: Nov. 9, 2023

(65) Prior Publication Data

US 2024/0068796 A1　　Feb. 29, 2024

Related U.S. Application Data

(63) Continuation of application No. PCT/JP2022/010522, filed on Mar. 10, 2022.

(30) Foreign Application Priority Data

May 11, 2021　(JP) ................................. 2021-080401

(51) Int. Cl.
*G01B 7/16* (2006.01)
*G01B 5/00* (2006.01)
*G01L 1/16* (2006.01)
(52) U.S. Cl.
CPC ............. *G01B 7/16* (2013.01); *G01B 5/0023* (2013.01); *G01L 1/16* (2013.01)

(58) Field of Classification Search
CPC ............ G01B 7/16; G01B 5/0023; G01L 1/16
(Continued)

(56) References Cited

U.S. PATENT DOCUMENTS 5,792,000 A　　8/1998 Weber et al.
6,048,276 A　*　4/2000 Vandergrift ............ A63B 53/08
　　　　　　　　　　　　　　　　　　310/326
(Continued)

FOREIGN PATENT DOCUMENTS

EP　　　3671107 A1　　6/2020
GB　　　2585709 A　　1/2021
(Continued)

OTHER PUBLICATIONS

International Search Report for PCT/JP2022/010522 dated May 24, 2022.

*Primary Examiner* — Peter J Macchiarolo
*Assistant Examiner* — John M Royston
(74) *Attorney, Agent, or Firm* — McDonald Hopkins LLC

(57) ABSTRACT

Provided is a sensor unit including a first sensor portion that detects deformation of a measuring target object and a second sensor portion that detects deformation of the measuring target object, in which in a state in which the first sensor portion and the second sensor portion are attached to the measuring target object, the first sensor portion and the second sensor portion are fixed to the measuring target object such that the measuring target object is disposed between the first sensor portion and the second sensor portion in a first direction, and a physical property value of the first sensor portion and a physical property value of the second sensor portion are changed according to first deformation of the measuring target object.

17 Claims, 13 Drawing Sheets

(58) Field of Classification Search
USPC ..................................................... 73/862.625
See application file for complete search history.

(56) References Cited

U.S. PATENT DOCUMENTS

| | | |
|---|---|---|
| 2005/0134470 A1 | 6/2005 | Bos |
| 2012/0075226 A1* | 3/2012 | Andoh .................. G06F 3/0416 |
| | | 345/173 |
| 2015/0247765 A1* | 9/2015 | Ando ................... H10N 30/302 |
| | | 310/331 |
| 2016/0129332 A1* | 5/2016 | Davenport ............. G06V 40/23 |
| | | 473/223 |
| 2017/0156636 A1 | 6/2017 | Kawamura |
| 2021/0213327 A1 | 7/2021 | Ohta et al. |

FOREIGN PATENT DOCUMENTS

| | | |
|---|---|---|
| JP | H10-244023 A | 9/1998 |
| JP | 2003-185507 A | 7/2003 |
| JP | 2005-532559 A | 10/2005 |
| JP | 2013-048893 A | 3/2013 |
| JP | 6342034 B1 | 6/2018 |
| WO | 2016/027614 A1 | 2/2016 |

* cited by examiner

SENSOR UNIT AND SENSOR UNIT ATTACHMENT METHOD

CROSS REFERENCE TO RELATED APPLICATION

This is a continuation of International Application No. PCT/JP2022/010522 filed on Mar. 10, 2022 which claims priority from Japanese Patent Application No. 2021-080401 filed on May 11, 2021. The contents of these applications are incorporated herein by reference in their entireties.

BACKGROUND OF THE DISCLOSURE

Field of the Disclosure

The present disclosure relates to a sensor unit and a sensor unit attachment method for detecting a shape change of a measuring target object.

Description of the Related Art

As a disclosure related to a sensor unit and a sensor unit attachment method in the related art, for example, a swing analysis device, a swing analysis method, and a swing analysis system described in Patent Document 1 are known. The swing analysis device described in Patent Document 1 includes: an information input portion that receives input of acceleration information, angular velocity information, and shaft distortion information detected by a sensor attached to a shaft of a golf club; a posture calculation unit that calculates posture information on the golf club during a swing period based on the acceleration information and the angular velocity information; a correction unit that corrects the posture information on the golf club at impact time based on the shaft distortion information; and a display control unit that displays the posture information on the golf club corrected by the correction unit on a display. According to such a swing analysis device, swing with a golf club can be analyzed.

Patent Document 1: Japanese Patent No. 6342034

BRIEF SUMMARY OF THE DISCLOSURE

By the way, in the swing analysis device described in Patent Document 1, there is a demand to improve the detection accuracy of the sensor.

Therefore, a possible benefit of the present disclosure is to provide a sensor unit and a sensor unit attachment method with excellent detection accuracy.

A sensor unit according to one aspect of the present disclosure is a sensor unit that detects deformation of a measuring target object, the sensor unit includes: a first sensor portion that detects deformation of the measuring target object; and a second sensor portion that detects deformation of the measuring target object, in which in a state in which the first sensor portion and the second sensor portion are attached to the measuring target object, the first sensor portion and the second sensor portion are fixed to the measuring target object such that the measuring target object is disposed between the first sensor portion and the second sensor portion in a first direction, and a physical property value of the first sensor portion and a physical property value of the second sensor portion are changed according to first deformation of the measuring target object.

A sensor unit attachment method according to another aspect of the present disclosure is a sensor unit attachment method of attaching a first sensor portion and a second sensor portion to a measuring target object of which a cross section that is perpendicular to a third direction has a point-symmetric shape, the sensor unit attachment method includes fixing the first sensor portion and the second sensor portion to the measuring target object such that the measuring target object is disposed between the first sensor portion and the second sensor portion, and such that a physical property value of the first sensor portion and a physical property value of the second sensor portion are changed according to deformation of the measuring target object.

In the present specification, a shaft or member extending in the third direction does not necessarily mean only a shaft or member parallel to the third direction. The shaft or member extending in the third direction is a shaft or member inclined in a range of ±45 degrees with respect to the third direction. Similarly, a shaft or member extending in a front-rear direction is a shaft or member inclined in a range of ±45 degrees with respect to the front-rear direction. A shaft or member extending in a left-right direction is a shaft or member inclined in a range of ±45 degrees with respect to the left-right direction. A shaft or member extending in an up-down direction is a shaft or member inclined in a range of ±45 degrees with respect to the up-down direction.

In the present specification, a direction is defined as follows. In golf clubs 20 and 20a to 20d, each of shafts 21 and 21a to 21d, which are measuring target objects, has a cylindrical shape, and a central axis direction of a cylinder of the shaft is defined as the third direction. A periphery of the third direction is defined as a peripheral direction. A direction orthogonal to the third direction is defined as the first direction. A direction orthogonal to the third direction and different from the first direction is defined as the second direction. Further, in a state in which sheets 13 and 13a to 13d are developed on planes, a normal direction of each of the main surfaces of the sheets 13 and 13a to 13d is defined as the front-rear direction.

In a state in which the sheets 13 and 13a to 13d are developed on planes, directions in which first sensor portions 11 and 11a to 11d, and second sensor portions 12 and 12a to 12d are arranged, are each defined as the left-right direction when viewed in the front-rear direction. A direction orthogonal to the front-rear direction and the left-right direction is defined as the up-down direction.

In the present specification, unless otherwise specified, each part of a first member is defined as follows. A front part of the first member means a front half of the first member. A rear part of the first member means a rear half of the first member. A left part of the first member means a left half of the first member. A right part of the first member means a right half of the first member. An upper part of the first member means an upper half of the first member. A lower part of the first member means a lower half of the first member.

According to the present disclosure, it is possible to provide a sensor unit and a sensor unit attachment method with excellent detection accuracy.

DETAILED DESCRIPTION OF THE DISCLOSURE

First Embodiment

Figure 1:
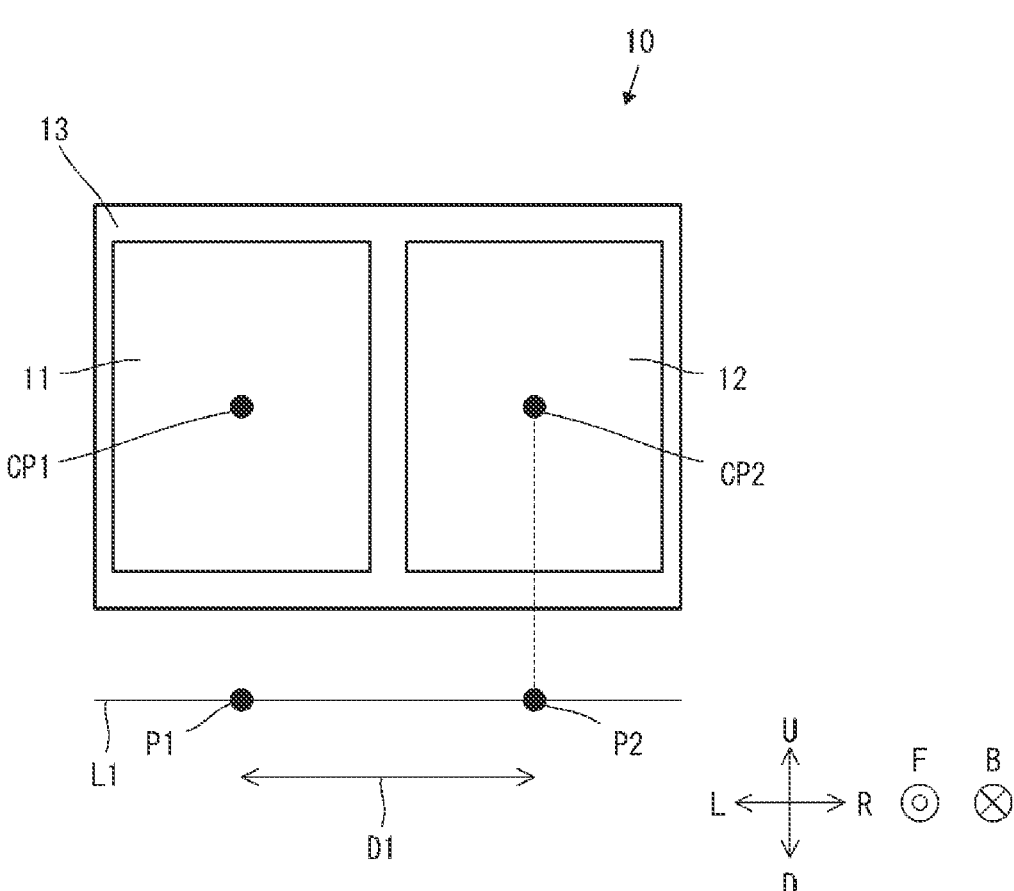
FIG. 1 is a plan view of a sensor unit 10 in a state in which a sheet 13 is developed on a plane according to a first embodiment.
Figure 2:
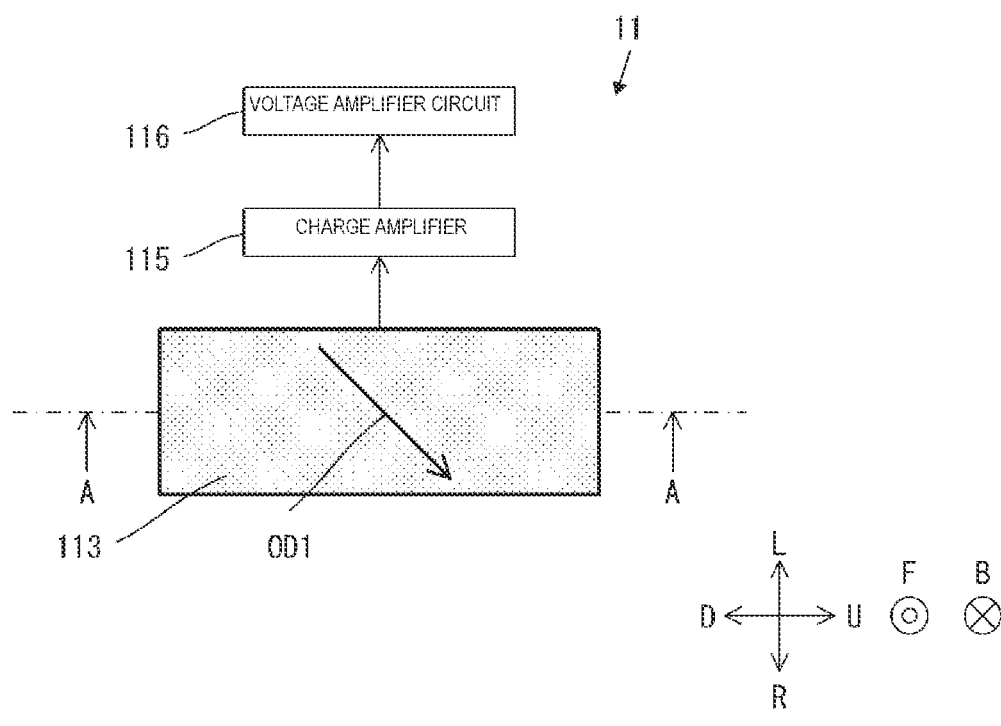
FIG. 2 includes a plan view and a cross-sectional view of a first sensor portion 11 in a state in which the sheet 13 is developed on a plane according to the first embodiment.
Figure 2:
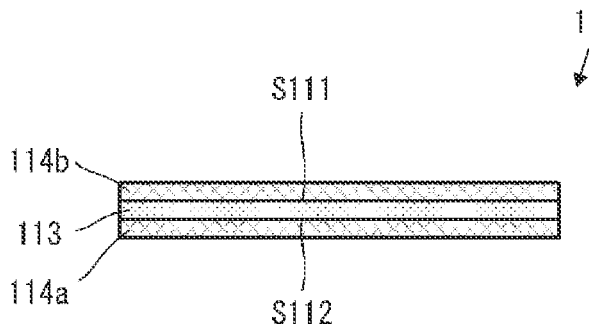
Figure 2:
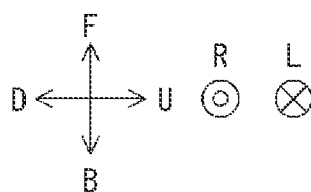
Figure 3:
FIG. 3 includes a plan view and a cross-sectional view of a second sensor portion 12 in a state in which the sheet 13 is developed on a plane according to the first embodiment.
Figure 3:
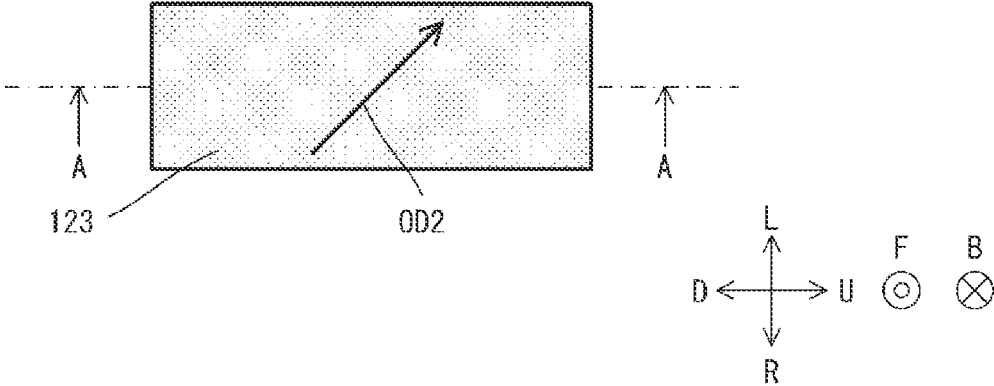
Figure 3:
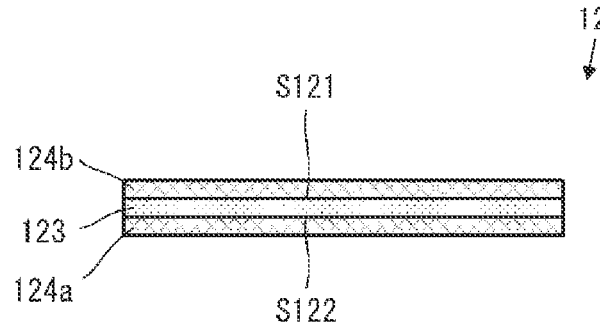
Figure 3:
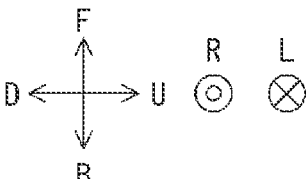
Figure 4:
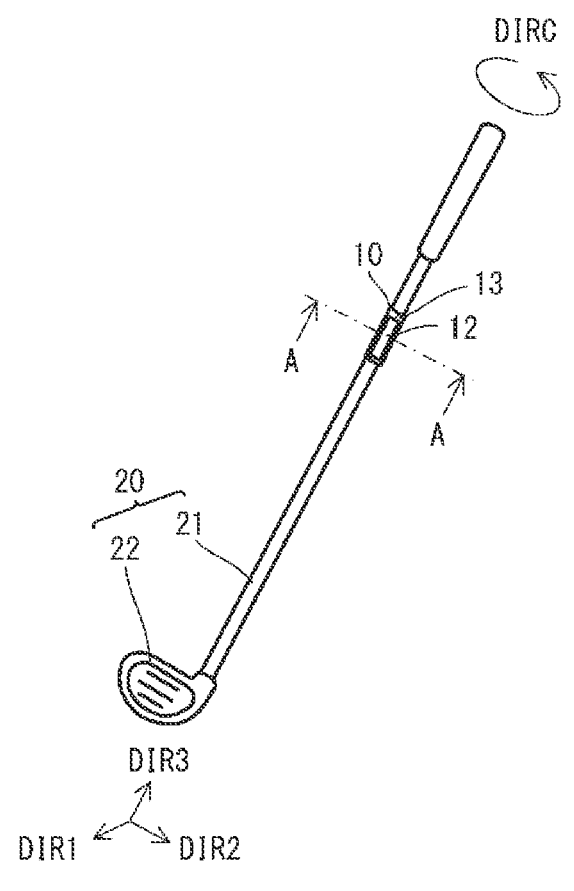
FIG. 4 is a perspective view in a state in which the sensor unit 10 is attached to a shaft 21 according to the first embodiment.
Figure 5:
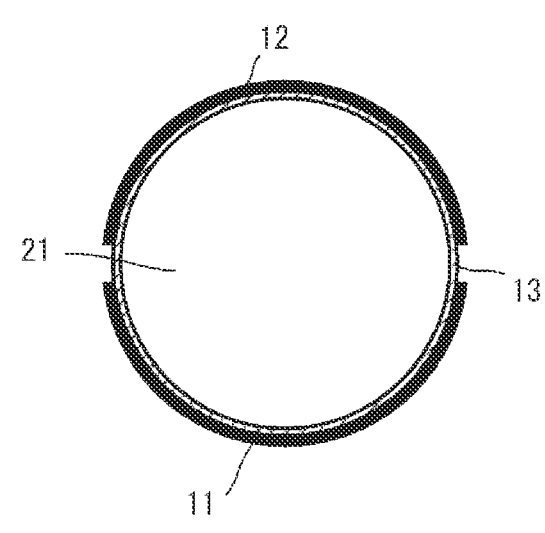
FIG. 5 is a cross-sectional view taken along the line A-A in a state in which the sensor unit 10 is attached to the shaft 21 according to the first embodiment.
Figure 5:

Hereinafter, a sensor unit 10 according to a first embodiment of the present disclosure will be described with reference to the drawings. FIG. 1 is a plan view of the sensor unit 10 in a state in which a sheet 13 is developed on a plane according to the first embodiment. FIG. 2 includes a plan view and a cross-sectional view of a first sensor portion 11 in a state in which the sheet 13 is developed on a plane according to the first embodiment. FIG. 3 includes a plan view and a cross-sectional view of a second sensor portion 12 in a state in which the sheet 13 is developed on a plane according to the first embodiment. FIG. 4 is a perspective view in a state in which the sensor unit 10 is attached to a shaft 21 according to the first embodiment. FIG. 5 is a cross-sectional view taken along the line A-A in a state in which the sensor unit 10 is attached to the shaft 21 according to the first embodiment.

The sensor unit 10 is a sensor unit that detects deformation of the shaft 21, which will be described later. As illustrated in FIG. 1, the sensor unit 10 includes the first sensor portion 11, the second sensor portion 12, and the sheet 13. The first sensor portion 11 and the second sensor portion 12 are arranged in this order from left to right.

The first sensor portion 11 detects deformation of the shaft 21, which will be described later, and has a film shape. The first sensor portion 11 includes a front main surface and a rear main surface. As illustrated in FIG. 2, the first sensor portion 11 includes a piezoelectric film 113, a first electrode 114*a*, a second electrode 114*b*, a charge amplifier 115, and a voltage amplifier circuit 116.

The piezoelectric film 113 is an example of a piezoelectric body. The piezoelectric film 113 has a film shape. Therefore, the piezoelectric film 113 (first piezoelectric body) includes a front main surface S111 (first piezoelectric body first main surface) and a rear main surface S112 (first piezoelectric body second main surface). A main surface of the piezoelectric film 113 (first piezoelectric body) has a rectangular shape when viewed in a normal direction of a main surface of the sheet 13 (first sheet) in a state in which the piezoelectric film 113 (first piezoelectric body) is developed on a plane. In the present embodiment, in a state where the sheet 13 (first sheet) is developed on a plane, the front main surface S111 and rear main surface S112 of the piezoelectric film 113 (first piezoelectric body) have a rectangular shape with long sides extending in the up-down direction and short sides extending in the left-right direction when viewed in the front-rear direction. In the present embodiment, a longitudinal direction of the piezoelectric film 113 (first piezoelectric body) is the up-down direction, and a transverse direction of the piezoelectric film 113 (first piezoelectric body) is the left-right direction. In the present embodiment, the piezoelectric film 113 is a PLA film.

The second sensor portion 12 detects deformation of the shaft 21, which will be described later, and has a film shape. However, a direction of the deformation of the shaft 21, which will be described later, detected by the first sensor portion 11 and a direction of the deformation of the shaft 21, which will be described later, detected by the second sensor portion 12 are the same direction. The second sensor portion 12 includes a front main surface and a rear main surface. As illustrated in FIG. 3, the second sensor portion 12 includes a piezoelectric film 123, a third electrode 124*a*, and a fourth electrode 124*b*.

The piezoelectric film 123 is an example of a piezoelectric body. The piezoelectric film 123 has a film shape. Therefore, the piezoelectric film 123 (second piezoelectric body) includes a front main surface S121 (second piezoelectric body first main surface) and a rear main surface S122 (second piezoelectric body second main surface). A main surface of the piezoelectric film 123 (second piezoelectric body) has a rectangular shape when viewed in the normal direction of the main surface of the sheet 13 (first sheet) in a state in which the piezoelectric film 123 (second piezoelectric body) is developed on a plane. In the present embodiment, in a state where the sheet 13 (first sheet) is developed on a plane, the front main surface S121 and rear main surface S122 of the piezoelectric film 123 (second piezoelectric body) have a rectangular shape with long sides extending in the up-down direction and short sides extending in the left-right direction when viewed in the front-rear direction. In the present embodiment, a longitudinal direction of the piezoelectric film 123 (second piezoelectric body) is the up-down direction, and a transverse direction of the piezoelectric film 123 (second piezoelectric body) is the left-right direction. In the present embodiment, the piezoelectric film 123 is a PLA film. The piezoelectric film 113 and the piezoelectric film 123 will be described in more detail below.

Each of the piezoelectric film 113 and the piezoelectric film 123 generates a charge in accordance with a differential value of a deformation amount of each of the piezoelectric film 113 and the piezoelectric film 123. The piezoelectric film 113 and the piezoelectric film 123 have characteristics in which a polarity of a charge, which is generated when each of the piezoelectric film 113 and the piezoelectric film 123 expands in the up-down direction, is opposite to a charge generated when each of the piezoelectric film 113 and piezoelectric film 123 expands in the left-right direction. Specifically, each of the piezoelectric film 113 and the piezoelectric film 123 is a film formed of a chiral polymer. The chiral polymer is, for example, polylactic acid (PLA), in particular, L-type polylactic acid (PLLA). The PLLA formed of a chiral polymer has a helical structure in a main chain. The PLLA has piezoelectricity in which molecules are oriented by being uniaxially stretched. Each of the piezoelectric film 113 and the piezoelectric film 123 has a piezoelectric constant of d14.

A uniaxial stretching axis OD1 of the piezoelectric film 113 (first piezoelectric body) forms an angle of 45 degrees clockwise with respect to the up-down direction and forms an angle of 45 degrees counterclockwise with respect to the left-right direction. That is, the piezoelectric film 113 (first piezoelectric body) is stretched at least in a uniaxial direction. The 45 degrees include, for example, an angle including substantially 45 degrees±10 degrees. As a result, the piezoelectric film 113 generates a charge when deformation occurs such that the piezoelectric film 113 expands in the up-down direction or when deformation occurs such that the piezoelectric film 113 contracts in the up-down direction. For example, a negative charge is generated when deformation occurs such that the piezoelectric film 113 expands in the up-down direction. For example, a positive charge is generated when deformation occurs such that the piezoelectric film 113 contracts in the up-down direction. The magnitude of the charge depends on the differential value of the deformation amount of the piezoelectric film 113 due to expansion or contraction.

A uniaxial stretching axis OD2 of the piezoelectric film 123 (second piezoelectric body) forms an angle of 45 degrees counterclockwise with respect to the up-down direction and forms an angle of 45 degrees clockwise with respect to the left-right direction. That is, the piezoelectric film 123 (second piezoelectric body) is stretched at least in a uniaxial direction. The 45 degrees include, for example, an angle including substantially 45 degrees±10 degrees. As a result, the uniaxial stretching axis OD1 of the piezoelectric film 113 (first piezoelectric body) forms an angle of 90 degrees clockwise with respect to the uniaxial stretching axis OD2 of the piezoelectric film 123 (second piezoelectric body) in a state in which the sheet 13 (first sheet) is developed on a plane. The 90 degrees include, for example, an angle including substantially 90 degrees±10 degrees. Further, the piezoelectric film 123 generates a charge when deformation occurs such that the piezoelectric film 123 expands in the up-down direction or when deformation occurs such that the piezoelectric film 123 contracts in the up-down direction. For example, a positive charge is generated when deformation occurs such that the piezoelectric film 123 expands in the up-down direction. For example, a negative charge is generated when deformation occurs such that the piezoelectric film 123 contracts in the up-down direction. The magnitude of the charge depends on the differential value of the deformation amount of the piezoelectric film 123 due to expansion or contraction.

The first electrode 114a is a signal electrode. As illustrated in FIG. 2, the first electrode 114a is provided on the rear main surface S112 (first piezoelectric body second main surface). The first electrode 114a covers the rear main surface S112. The first electrode 114a is, for example, an organic electrode such as indium tin oxide (ITO) or zinc oxide (ZnO), a metal film by evaporation or plating, or a printed electrode film made of silver paste.

The second electrode 114b is a ground electrode. The second electrode 114b is connected to a ground potential. As illustrated in FIG. 2, the second electrode 114b is provided on the front main surface S111 (first piezoelectric body first piezoelectric body first main surface). As a result, the piezoelectric film 113 is positioned between the first electrode 114a and the second electrode 114b. The second electrode 114b covers the front main surface S111. The second electrode 114b is, for example, an organic electrode such as indium tin oxide (ITO) or zinc oxide (ZnO), a metal film by evaporation or plating, or a printed electrode film made of silver paste.

Such a first sensor portion 11 is attached to the sheet 13 (first sheet) with an adhesion layer (not illustrated) interposed therebetween. More specifically, the adhesion layer has conductive properties. Specifically, the adhesion layer fixes the first electrode 114a to a front main surface of the sheet 13 (first sheet). That is, the rear main surface of the first sensor portion 11 is fixed to the front main surface of the sheet 13.

The third electrode 124a is a signal electrode. As illustrated in FIG. 3, the third electrode 124a is provided on the rear main surface S122 (second piezoelectric body second main surface). The third electrode 124a covers the rear main surface S122. The third electrode 124a is, for example, an organic electrode such as indium tin oxide (ITO) or zinc oxide (ZnO), a metal film by evaporation or plating, or a printed electrode film made of silver paste.

The fourth electrode 124b is a ground electrode. The fourth electrode 124b is connected to a ground potential. As illustrated in FIG. 3, the fourth electrode 124b is provided on the front main surface S121 (second piezoelectric body first main surface). As a result, the piezoelectric film 123 is positioned between the third electrode 124a and the fourth electrode 124b. The fourth electrode 124b covers the front main surface S121. The fourth electrode 124b is, for example, an organic electrode such as indium tin oxide (ITO) or zinc oxide (ZnO), a metal film by evaporation or plating, or a printed electrode film made of silver paste.

Such a second sensor portion 12 is attached to the sheet 13 (first sheet) with an adhesion layer (not illustrated) interposed therebetween. More specifically, the adhesion layer has conductive properties. Specifically, the adhesion layer fixes the third electrode 124a to the front main surface of the sheet 13 (first sheet). That is, the rear main surface of the second sensor portion 12 is fixed to the front main surface of the sheet 13.

The sheet 13 is a sheet that is attached to the shaft 21, which will be described later. The sheet 13 (first sheet) has conductive properties. As a result, the sheet 13 (first sheet) electrically connects the first electrode 114a and the third electrode 124a of the second sensor portion 12. Therefore, the third electrode 124a is connected to the charge amplifier 115 with the first electrode 114a interposed therebetween.

The charge amplifier 115 converts the charges generated by the piezoelectric film 113 and the piezoelectric film 123 into a detection signal that is a voltage signal, and outputs the detection signal to the voltage amplifier circuit 116. The voltage amplifier circuit 116 amplifies the detection signal and outputs the detection signal.

Return to the description of the sheet 13. The sheet 13 includes the front main surface and a rear main surface. Shapes of the front main surface and rear main surface of the sheet 13 are rectangular shapes. The front main surface of the sheet 13 has a rectangular shape including a left short side that extends in the up-down direction, a right short side that extends in the up-down direction, an upper long side that extends in the left-right direction, and a lower long side that extends in the left-right direction. The rear main surface of the sheet 13 includes a left short side that extends in the up-down direction, a right short side that extends in the up-down direction, an upper long side that extends in the left-right direction, and a lower long side that extends in the left-right direction. Lengths of the upper long side and lower long side of the front main surface of the sheet 13 and lengths of the upper long side and lower long side of the rear main surface of the sheet 13 are equal to or longer than a circumference of a cross-sectional circle of the shaft 21, which will be described later in a state in which the sheet 13 is developed on a plane. The adhesion layer (not illustrated) is provided on the rear main surface of the sheet 13. The adhesion layer has insulating properties.

As illustrated in FIG. 1, in a state in which the sheet 13 is developed on a plane, the front main surface of the first sensor portion 11 is disposed at a position that does not overlap the front main surface of the second sensor portion 12 when viewed in the front-rear direction. That is, the front main surface of the first sensor portion 11 includes a portion that does not overlap the front main surface of the second sensor portion 12 when viewed in the front-rear direction in a state in which the sheet 13 is developed on a plane. The front main surface of the second sensor portion 12 is disposed at a position that does not overlap the front main surface of the first sensor portion 11 when viewed in the front-rear direction. That is, the front main surface of the second sensor portion 12 includes a portion that does not overlap the front main surface of the first sensor portion 11 when viewed in the front-rear direction in a state in which the sheet 13 is developed on a plane.

As illustrated in FIG. 1, in a state in which the sheet 13 (first sheet) is developed on a plane, the left short side and right short side of the front main surface of the sheet 13, the long side of the first sensor portion 11 (longitudinal direction of the first piezoelectric body), and the long side of the second sensor portion 12 (longitudinal direction of the second piezoelectric body) are parallel to each other. Further, in a state in which the sheet 13 is developed on a plane, the upper long side and lower long side of the front main surface of the sheet 13, the short side of the first sensor portion 11, and the short side of the second sensor portion 12 are parallel to each other.

As illustrated in FIG. 1, in a state in which the sheet 13 is developed on a plane, a first center point CP1 of the first sensor portion 11 is defined when viewed in the front-rear direction. The first center point CP1 is, for example, the center of gravity of the front main surface of the first sensor portion 11. Further, the first center point CP1 may be, for example, the center of gravity of the rear main surface of the first sensor portion 11. Further, the first center point CP1 may be, for example, a center of the front main surface of the first sensor portion 11. At this time, for example, when two diagonal lines are defined on the front main surface of the first sensor portion 11, the two diagonal lines intersect at the first center point CP1. Further, for example, on the front main surface of the first sensor portion 11, when a straight line connecting midpoints of the two short sides and a straight line connecting midpoints of the two long sides are defined, the straight line connecting the midpoints of the two short sides and the straight line connecting the midpoints of the two long sides intersect at the first center point CP1. Further, the first center point CP1 may be, for example, a center of the rear main surface of the first sensor portion 11. At this time, for example, when two diagonal lines are defined on the rear main surface of the first sensor portion 11, the two diagonal lines intersect at the first center point CP1. Further, for example, on the rear main surface of the first sensor portion 11, when a straight line connecting midpoints of the two short sides and a straight line connecting midpoints of the two long sides are defined, the straight line connecting the midpoints of the two short sides and the straight line connecting the midpoints of the two long sides intersect at the first center point CP1.

Similarly, in a state in which the sheet 13 is developed on a plane, a second center point CP2 of the second sensor portion 12 is defined when viewed in the front-rear direction. Since the definition of the second center point CP2 conforms to the definition of the first center point CP1, the detailed description is omitted.

As illustrated in FIG. 1, in a state in which the sheet 13 is developed on a plane, any straight line L1 extending in the left-right direction is defined when viewed in the front-rear direction. In a state in which the sheet 13 is developed on a plane, an intersection point between a perpendicular line drawn from the first center point CP1 to the straight line L1 and the straight line L1 is defined as a first intersection point P1 when viewed in the front-rear direction. Further, an intersection point between a perpendicular line drawn from the second center point CP2 to the straight line L1 and the straight line L1 is defined as a second intersection point P2 when viewed in the front-rear direction. A distance between the first intersection point P1 and the second intersection point P2 is defined as a first distance D1. The first distance D1 in the present embodiment is equal to one-half of a length of the circumference of the cross-sectional circle of the shaft 21, which will be described later, in a state in which the sheet 13 is developed on a plane.

As illustrated in FIG. 4, the golf club 20 includes the shaft 21 and a head 22. A shape of the shaft 21 is a cylindrical shape. The central axis direction of the cylinder is equal to the third direction DIR3. That is, the shaft 21 extends in the third direction DIR3. A cross section of the shaft 21 perpendicular to the third direction DIR3 has a circular shape. A circumference direction of the cross-sectional circle of the shaft 21 is equal to the peripheral direction DIRC. The shaft 21 includes a first end and a second end in the third direction DIR3. The head 22 is provided at the first end of the shaft 21. A grip is provided near the second end of the shaft 21. In the present embodiment, the measuring target object is the shaft 21.

The sensor unit 10 is attached to a circumference surface of the shaft 21. Specifically, the rear main surface of the sheet 13 is fixed to the shaft 21 with the adhesion layer (not illustrated) provided on the rear main surface of the sheet 13. In the example in FIG. 4, although the sensor unit 10 is attached in the vicinity of the grip of the shaft 21, an attaching position of the sensor unit 10 on the shaft 21 is not limited to this. In a state in which the sensor unit 10 is attached to the shaft 21, an extending direction of the upper long side and lower long side of the front main surface of the sheet 13 is equal to the peripheral direction DIRC.

As described above, the extending direction of the upper long side and lower long side of the front main surface of the sheet 13 is equal to the peripheral direction DIRC. As a result, the first distance D1 is equal to a distance in the peripheral direction DIRC between the first center point CP1 of the first sensor portion 11 and the second center point CP2 of the second sensor portion 12. Further, as described above, the first distance D1 is equal to one-half of a length of the circumference of the cross-sectional circle of the shaft 21 in a state in which the sheet 13 is developed on a plane. As a result, the first center point CP1 of the first sensor portion 11 and the second center point CP2 of the second sensor portion 12 are disposed to be separated by 180 degrees in the peripheral direction DIRC of the shaft 21. That is, as illustrated in FIG. 5, in a state in which the sensor unit 10 is attached to the shaft 21, the first sensor portion 11 and the second sensor portion 12 are fixed to the shaft 21 such that the shaft 21 is disposed between the first sensor portion 11 and the second sensor portion 12 in the first direction DIR1. As a result, the first sensor portion 11 detects deformation of the shaft 21 in the first direction DIR1. Similarly, the second sensor portion 12 detects deformation of the shaft 21 in the first direction DIR1. In the present embodiment, the deformation of the shaft 21 detected by the first sensor portion 11 is deformation (bent) of the shaft 21 in the first direction DIR1, and the deformation of the shaft 21 detected by the second sensor portion 12 is deformation (bent) of the shaft 21 in the first direction DIR1.

For example, when deformation occurs in the shaft 21 in the first direction DIR1, the piezoelectric film 113 generates a charge and the piezoelectric film 123 generates a charge according to the deformation of the shaft 21. That is, the electric characteristics of the piezoelectric film 113 and the electric characteristics of the piezoelectric film 123 are changed according to deformation (first deformation) of the shaft 21. Since the piezoelectric film 113 contracts in the up-down direction, a positive charge is generated, and since the piezoelectric film 123 expands in the up-down direction, a positive charge is generated. That is, a polarity of the charge generated by the piezoelectric film 113 and a polarity of the charge generated by the piezoelectric film 123 are the same.

However, when deformation occurs in the shaft 21 in the second direction DIR2, the piezoelectric film 113 generates no charge or very little charge, and the piezoelectric film 123 generates no charge or very little charge according to the deformation of the shaft 21. That is, the electric characteristics of the piezoelectric film 113 and the electric characteristics of the piezoelectric film 123 are not changed or hardly changed according to the deformation (second deformation) of the shaft 21.

Effects

According to the sensor unit 10, detection accuracy can be improved. More specifically, the cross section of the shaft 21 perpendicular to the third direction DIR3 has a circular shape. The first sensor portion 11 and the second sensor portion 12 are fixed to the shaft 21 such that the shaft 21 is disposed between the first sensor portion 11 and the second sensor portion 12 in the first direction DIR1, in a state of being attached to the shaft 21. The electric characteristics of the first sensor portion 11 and the electric characteristics of the second sensor portion 12 are changed according to the deformation of the shaft 21. As a result, when the deformation (bent) occurs in the shaft 21 in the first direction DIR1, the piezoelectric film 113 contracts, the piezoelectric film 123 expands, and both the piezoelectric film 113 and the piezoelectric film 123 generate charges. Therefore, a potential of the detection signal of the first sensor portion 11 is changed, and a potential of the detection signal of the second sensor portion 12 is changed. As a result, the detection signal of the first sensor portion 11 and the detection signal of the second sensor portion 12 can be used to detect deformation of the shaft 21. As a result, according to the sensor unit 10, the detection accuracy of the deformation of the shaft 21 can be improved.

According to the sensor unit 10, the detection signals of the first sensor portion 11 and the second sensor portion 12 are easily generated. More specifically, the uniaxial stretching axis OD1 of the piezoelectric film 113 (first piezoelectric body) forms an angle of 45 degrees clockwise with respect to the up-down direction and forms an angle of 45 degrees counterclockwise with respect to the left-right direction. A uniaxial stretching axis OD2 of the piezoelectric film 123 (second piezoelectric body) forms an angle of 45 degrees counterclockwise with respect to the up-down direction and forms an angle of 45 degrees clockwise with respect to the left-right direction. As a result, the uniaxial stretching axis OD1 of the piezoelectric film 113 (first piezoelectric body) forms an angle of 90 degrees clockwise with respect to the uniaxial stretching axis OD2 of the piezoelectric film 123 (second piezoelectric body) in a state in which the sheet 13 (first sheet) is developed on a plane. As a result, when the deformation (bent) occurs in the shaft 21 in the first direction DIR1, the polarity of the charge generated by the piezoelectric film 113 and the polarity of the charge generated by the piezoelectric film 123 are the same. Therefore, the detection signal can be generated by adding the charge generated by the piezoelectric film 113 and the charge generated by the piezoelectric film 123. As a result, the detection signals of the first sensor portion 11 and the second sensor portion 12 are easily generated.

According to the sensor unit 10, the sheet 13 (first sheet) electrically connects the first electrode 114a and the third electrode 124a. As a result, the detection signals of the first sensor portion 11 and the second sensor portion 12 can be generated by one charge amplifier 115 and one voltage amplifier circuit 116. As a result, a circuit configuration of the sensor unit 10 is simplified.

First Modification Example

Figure 6:
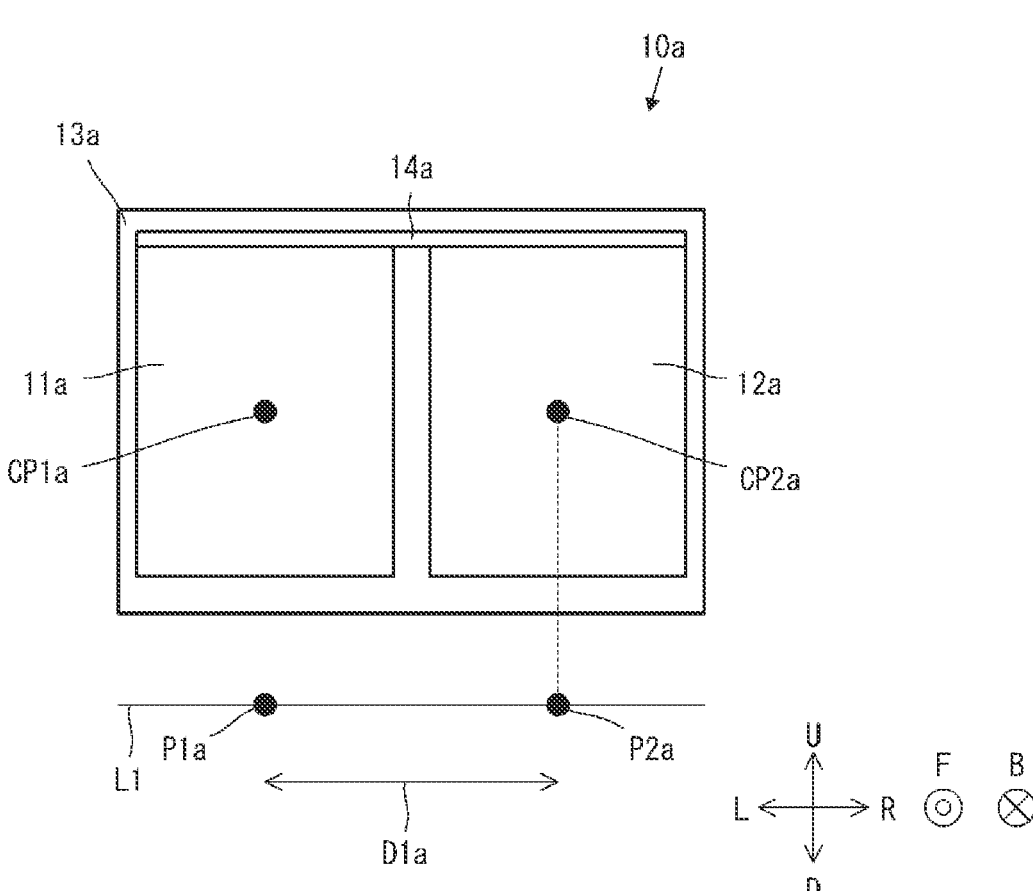
FIG. 6 is a plan view of a sensor unit 10*a* in a state in which a sheet 13*a* is developed on a plane according to a first modification example.

Hereinafter, a sensor unit 10a according to a first modification example of the present disclosure will be described with reference to the drawings. FIG. 6 is a plan view of the sensor unit 10a in a state in which a sheet 13a is developed on a plane according to the first modification example. As for the sensor unit 10a according to the first modification example, only a portion that is different from the disposition structure of the sensor unit 10 according to the first embodiment will be described, and the rest will be omitted.

As illustrated in FIG. 6, the sensor unit 10a further includes a sheet 14a. The sheet 13a (first sheet) has insulating properties. The sheet 14a (second sheet) has conductive properties. The sheet 14a has a band shape extending in the left-right direction when viewed in the front-rear direction. The sheet 14a is attached to a first sensor portion 11a and a second sensor portion 12a. Specifically, the sheet 14a (second sheet) electrically connects the first electrode 114a and the third electrode 124a.

A left part of the sheet 14a is attached to an upper part of the first electrode 114a. A right part of the sheet 14a is attached to an upper part of the third electrode 124a.

The same effects as those of the sensor unit 10 are obtained in the sensor unit 10a as described above.

In the present modification example, although the sheet 14a electrically connects the first electrode 114a and the third electrode 124a, the sheet 14a may electrically connect the second electrode 114b and the fourth electrode 124b.

Further, the sensor unit 10a may further include a sheet 14e having conductive properties, and the first sensor portion 11a and the second sensor portion 12a may be connected to each other with the sheet 14e. Specifically, the sheet 14a may connect the first electrode 114a and the third electrode 124a, and the sheet 14e may connect the second electrode 114b and the fourth electrode 124b. That is, the sheet 14a (second sheet) may electrically connect the first electrode 114a and the third electrode 124a, and the sheet 14e (third sheet) may electrically connect the second electrode 114b and the fourth electrode 124b.

Second Embodiment

Figure 7:
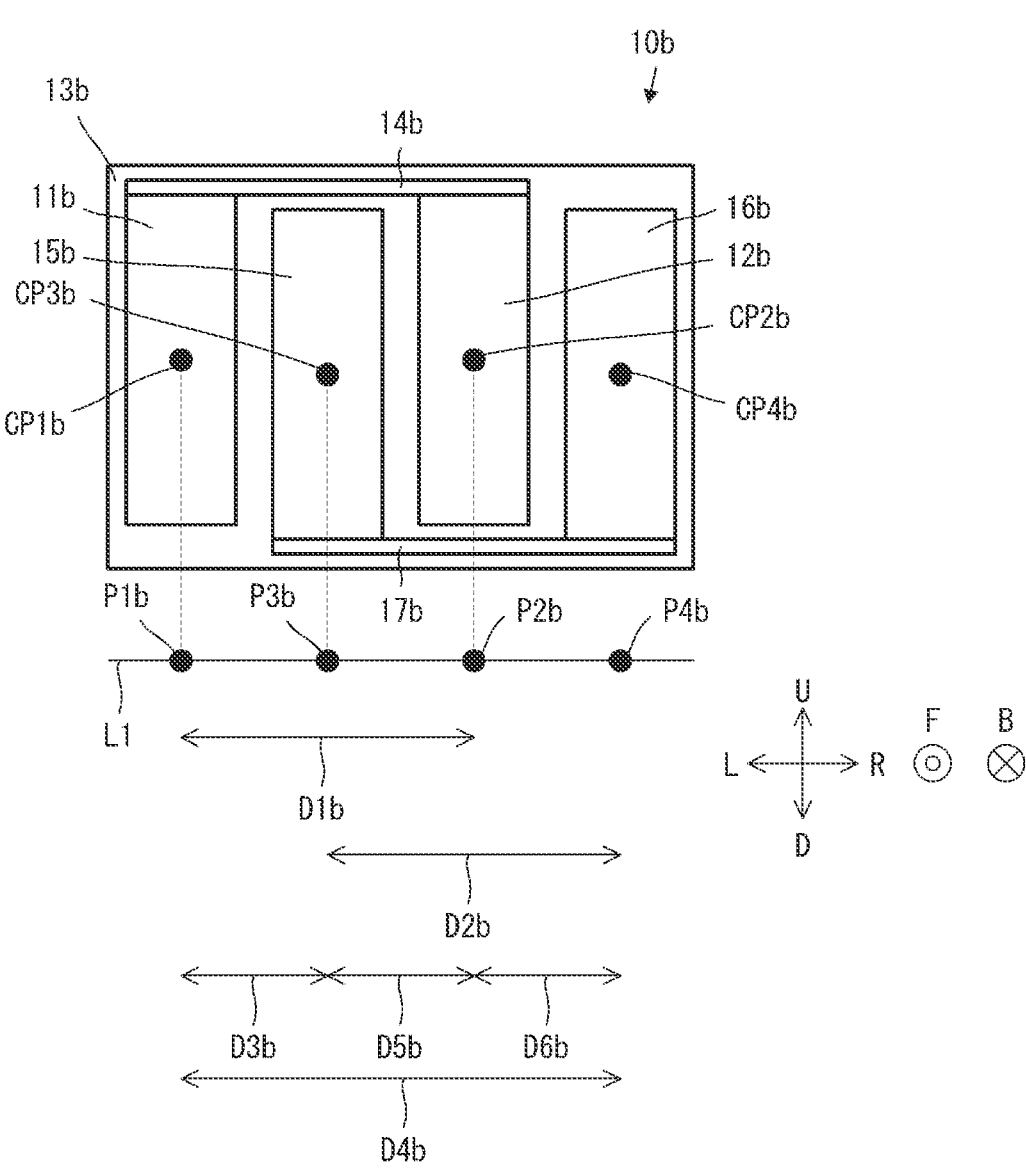
FIG. 7 is a plan view of a sensor unit 10*b* in a state in which a sheet 13*b* is developed on a plane according to a second embodiment.
Figure 8:
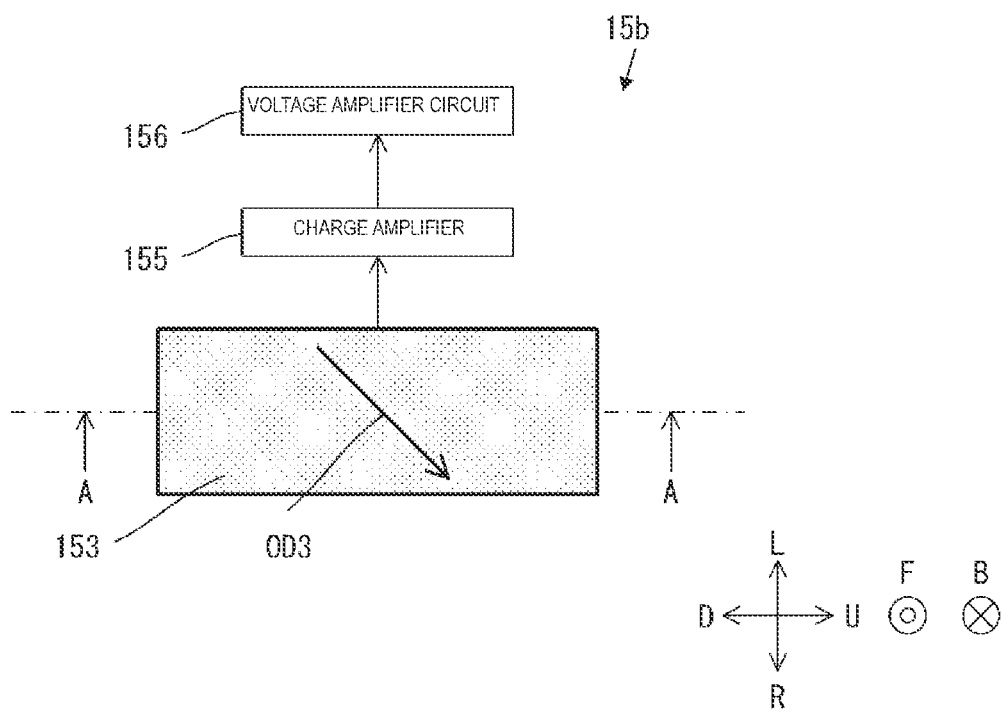
FIG. 8 includes a plan view and a cross-sectional view of a third sensor portion 15*b* in a state in which the sheet 13*b* is developed on a plane according to the second embodiment.
Figure 8:
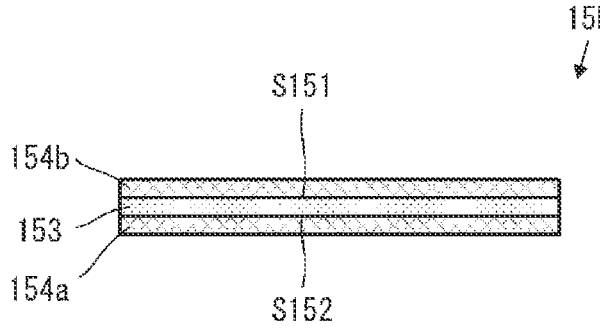
Figure 8:
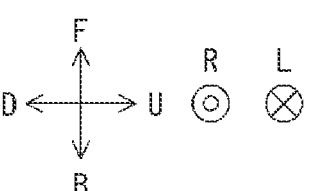
Figure 9:
FIG. 9 includes a plan view and a cross-sectional view of a fourth sensor portion 16*b* in a state in which the sheet 13*b* is developed on a plane according to the second embodiment.
Figure 9:
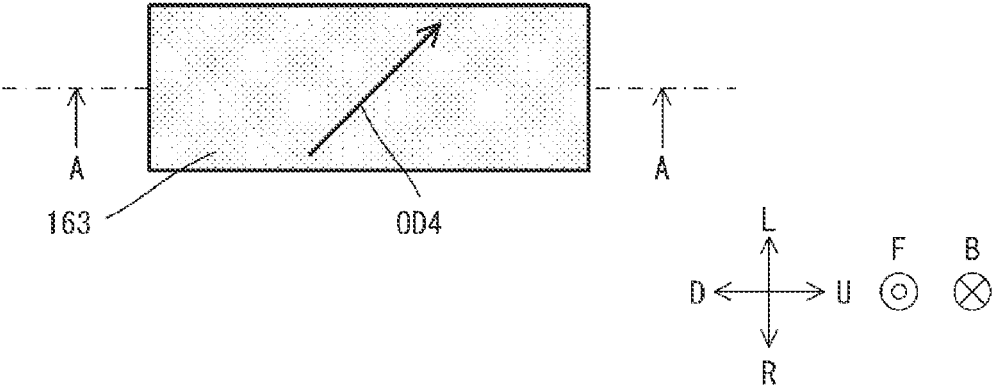
Figure 9:
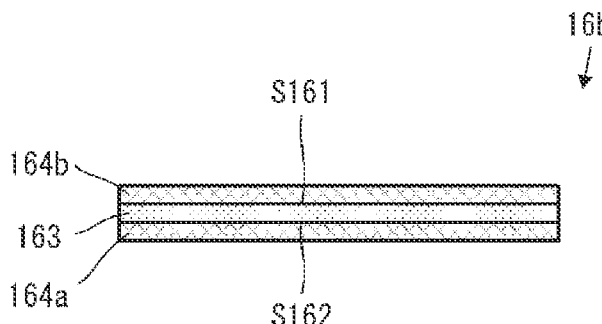
Figure 9:
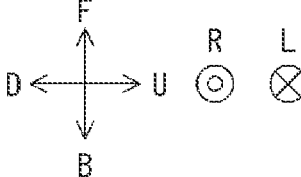
Figure 10:
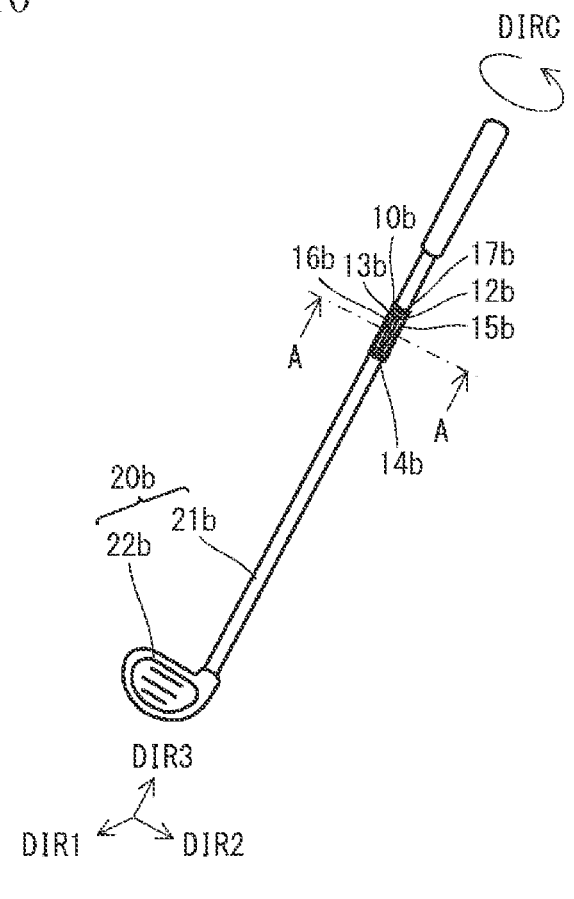
FIG. 10 is a perspective view in a state in which the sensor unit 10*b* is attached to a shaft 21*b* according to the second embodiment.
Figure 11:
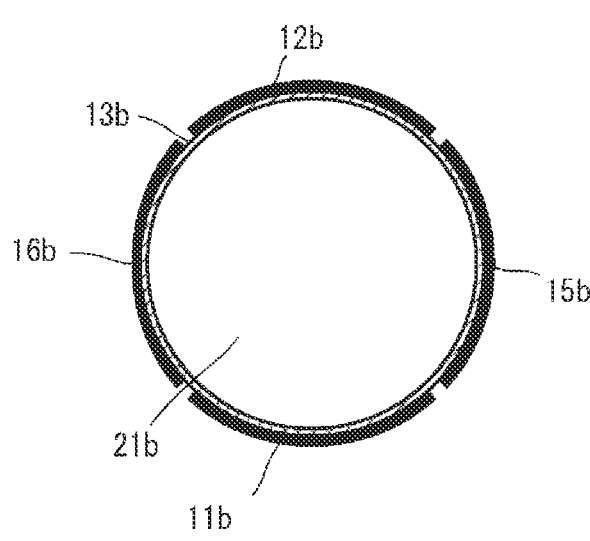
FIG. 11 is a cross-sectional view taken along the line A-A in a state in which the sensor unit 10*b* is attached to the shaft 21*b* according to the second embodiment.
Figure 11:

Hereinafter, a sensor unit 10b according to a second embodiment of the present disclosure will be described with reference to the drawings. FIG. 7 is a plan view of the sensor unit 10b in a state in which a sheet 13b is developed on a plane according to the second embodiment. FIG. 8 includes a plan view and a cross-sectional view of a third sensor portion 15b in a state in which the sheet 13b is developed on a plane according to the second embodiment. FIG. 9 includes a plan view and a cross-sectional view of a fourth sensor portion 16b in a state in which the sheet 13b is developed on a plane according to the second embodiment. FIG. 10 is a perspective view in a state in which the sensor unit 10b is attached to a shaft 21b according to the second embodiment. FIG. 11 is a cross-sectional view taken along the line A-A in a state in which the sensor unit 10b is attached to the shaft 21b according to the second embodiment. As for the sensor unit 10b according to the second embodiment, only a portion that is different from the disposition structure of the sensor unit 10 according to the first embodiment will be described, and the rest will be omitted.

As illustrated in FIG. 7, the sensor unit 10b further includes a sheet 14b, the third sensor portion 15b, the fourth sensor portion 16b, and a sheet 17b. In a state in which the sheet 13b is developed on a plane, the first sensor portion 11b, the second sensor portion 12b, the third sensor portion 15b, and the fourth sensor portion 16b are arranged in this order from left to right. The sheet 13b (first sheet) has insulating properties. The sheet 14b (second sheet) and the sheet 17b (fourth sheet) have conductive properties.

The third sensor portion 15b detects deformation of the shaft 21b, which is the measuring target object, and has a film shape. However, a direction of deformation (first direction) of the shaft 21b, which is the measuring target object, detected by the first sensor portion 11b and the second sensor portion 12b, and a direction of deformation (second direction) of the shaft 21b, which is the measuring target object, detected by the third sensor portion 15b are directions different from each other. The third sensor portion 15b includes a front main surface and a rear main surface.

As illustrated in FIG. 8, the third sensor portion 15b includes a piezoelectric film 153, a fifth electrode 154a, a sixth electrode 154b, a charge amplifier 155, and a voltage amplifier circuit 156.

The piezoelectric film 153 is an example of a piezoelectric body. The piezoelectric film 153 has a film shape. Therefore, the piezoelectric film 153 (third piezoelectric body) includes a front main surface S151 (third piezoelectric body first main surface) and a rear main surface S152 (third piezoelectric body second main surface). A main surface of the piezoelectric film 153 (third piezoelectric body) has a rectangular shape when viewed in the normal direction of a main surface of the sheet 13b (first sheet) in a state in which the piezoelectric film 153 (third piezoelectric body) is developed on a plane. In the present embodiment, in a state where the sheet 13b (first sheet) is developed on a plane, the front main surface S151 and rear main surface S152 of the piezoelectric film 153 (third piezoelectric body) have a rectangular shape with long sides extending in the up-down direction and short sides extending in the left-right direction when viewed in the front-rear direction. In the present embodiment, a longitudinal direction of the piezoelectric film 153 (third piezoelectric body) is the up-down direction, and a transverse direction of the piezoelectric film 153 (third piezoelectric body) is the left-right direction. In the present embodiment, the piezoelectric film 153 is a PLA film. The PLA film is the same as that in the first embodiment, and the description is omitted. In the present embodiment, a uniaxial stretching axis OD3 of the piezoelectric film 153 (third piezoelectric body) forms an angle of 45 degrees clockwise with respect to the up-down direction and forms an angle of 45 degrees counterclockwise with respect to the left-right direction. That is, the piezoelectric film 153 (third piezoelectric body) is stretched at least in a uniaxial direction. The 45 degrees include, for example, an angle including substantially 45 degrees±10 degrees. Since the fifth electrode 154a, the sixth electrode 154b, the charge amplifier 155, and the voltage amplifier circuit 156 have the same structure as the first electrode 114a, the second electrode 114b, the charge amplifier 115, and the voltage amplifier circuit 116, the description thereof is omitted.

Such a third sensor portion 15b is attached to the sheet 13b (first sheet) with an adhesion layer (not illustrated) interposed therebetween. Specifically, the adhesion layer fixes the fifth electrode 154a to a front main surface of the sheet 13b (first sheet). That is, the rear main surface of the third sensor portion 15b is fixed to the front main surface of the sheet 13b.

The fourth sensor portion 16b detects deformation of the shaft 21b, which is the measuring target object, and has a film shape. However, a direction of deformation of the shaft 21b, which is the measuring target object, detected by the third sensor portion 15b and a direction of deformation of the shaft 21b, which is the measuring target object, detected by the fourth sensor portion 16b are the same direction. The fourth sensor portion 16b includes a front main surface and a rear main surface.

As illustrated in FIG. 9, the fourth sensor portion 16b includes a piezoelectric film 163, a seventh electrode 164a, and an eighth electrode 164b.

The piezoelectric film 163 is an example of a piezoelectric body. The piezoelectric film 163 has a film shape. Therefore, the piezoelectric film 163 (fourth piezoelectric body) includes a front main surface S161 (fourth piezoelectric body first main surface) and a rear main surface S162 (fourth piezoelectric body second main surface). A main surface of the piezoelectric film 163 (fourth piezoelectric body) has a rectangular shape when viewed in the normal direction of the main surface of the sheet 13b (first sheet) in a state in which the piezoelectric film 163 (fourth piezoelectric body) is developed on a plane. In the present embodiment, in a state where the sheet 13b (first sheet) is developed on a plane, the front main surface S161 and rear main surface S162 of the piezoelectric film 163 (fourth piezoelectric body) have a rectangular shape with long sides extending in the up-down direction and short sides extending in the left-right direction when viewed in the front-rear direction. In the present embodiment, a longitudinal direction of the piezoelectric film 163 (piezoelectric body) of the fourth sensor portion 16b is the up-down direction, and a transverse direction of the piezoelectric film 163 (piezoelectric body) of the fourth sensor portion 16b is the left-right direction. Further, in the present embodiment, the piezoelectric film 163 is a PLA film. The PLA film is the same as that in the first embodiment, and the description is omitted. In the present embodiment, a uniaxial stretching axis OD4 of the piezoelectric film 163 (fourth piezoelectric body) forms an angle of 45 degrees counterclockwise with respect to the up-down direction and forms an angle of 45 degrees clockwise with respect to the left-right direction. That is, the piezoelectric film 163 (fourth piezoelectric body) is stretched at least in a uniaxial direction. The 45 degrees include, for example, an angle including substantially 45 degrees±10 degrees. As a result, the uniaxial stretching axis OD3 of the piezoelectric film 153 (third piezoelectric body) forms an angle of 90 degrees clockwise with respect to the uniaxial stretching axis OD4 of the piezoelectric film 163 (fourth piezoelectric body) in a state in which the sheet 13b (first sheet) is developed on a plane. The 90 degrees include, for example, an angle including substantially 90 degrees±10 degrees. Since the seventh electrode 164a and the eighth electrode 164b have the same structure as the first electrode 114a and the second electrode 114b, the description thereof is omitted.

Such a fourth sensor portion 16b is attached to the sheet 13b (first sheet) with an adhesion layer (not illustrated) interposed therebetween. Specifically, the adhesion layer fixes the seventh electrode 164a to a front main surface of the sheet 13b (first sheet). That is, the rear main surface of the fourth sensor portion 16b is fixed to the front main surface of the sheet 13b.

As illustrated in FIG. 7, the sheet 14b (second sheet) is attached to the first sensor portion 11b and the second sensor portion 12b. Specifically, the sheet 14b (second sheet) electrically connects the first electrode 114a and the third electrode 124a. A left part of the sheet 14b is attached to an upper part of the first electrode 114a. A right part of the sheet 14b is attached to an upper part of the third electrode 124a.

As illustrated in FIG. 7, the sheet 17b (fourth sheet) is attached to the third sensor portion 15b and the fourth sensor portion 16b. Specifically, the sheet 17b (fourth sheet) electrically connects the fifth electrode 154a and the seventh electrode 164a. A left part of the sheet 17b is attached to a lower part of the fifth electrode 154a. A right part of the sheet 17b is attached to a lower part of the seventh electrode 164a.

As illustrated in FIG. 7, in a state in which the sheet 13b is developed on a plane, the front main surface of the third sensor portion 15b is disposed at a position that does not overlap the front main surface of the fourth sensor portion 16b when viewed in the front-rear direction. That is, the front main surface of the third sensor portion 15b includes a portion that does not overlap the front main surface of the fourth sensor portion 16b when viewed in the front-rear direction in a state in which the sheet 13b is developed on a plane. The front main surface of the fourth sensor portion 16b is disposed at a position that does not overlap the front main surface of the third sensor portion 15b when viewed in the front-rear direction. That is, the front main surface of the fourth sensor portion 16b includes a part that does not overlap the front main surface of the third sensor portion 15b when viewed in the front-rear direction in a state in which the sheet 13b is developed on a plane.

As illustrated in FIG. 7, in a state in which the sheet 13b (first sheet) is developed on a plane, a left short side and right short side of the front main surface of the sheet 13b, a long side of the first sensor portion 11b (longitudinal direction of the first piezoelectric body), a long side of the second sensor portion 12b (longitudinal direction of the second piezoelectric body), a long side of the third sensor portion 15b (longitudinal direction of the third piezoelectric body), and a long side of the fourth sensor portion 16b (longitudinal direction of the fourth piezoelectric body) are parallel to each other. Further, in a state in which the sheet 13b is developed on a plane, an upper long side and lower long side of the front main surface of the sheet 13b, a short side of the first sensor portion lib, a short side of the second sensor portion 12b, a short side of the third sensor portion 15b, and a short side of the fourth sensor portion 16b are parallel to each other.

As illustrated in FIG. 7, in a state in which the sheet 13b is developed on a plane, a third center point CP3b of the third sensor portion 15b and a fourth center point CP4b of the fourth sensor portion 16b are defined when viewed in the front-rear direction. Since the definition of the third center point CP3b and the definition of the fourth center point CP4b conform to the definition of the first center point CP1, a detailed description thereof is omitted.

As illustrated in FIG. 7, in a state in which the sheet 13b is developed on a plane, an intersection point between a perpendicular line drawn from the third center point CP3b to a straight line L1 and the straight line L1 is defined as a third intersection point P3b when viewed in the front-rear direction. Further, an intersection point between a perpendicular line drawn from the fourth center point CP4b to the straight line L1 and the straight line L1 is defined as a fourth intersection point P4b when viewed in the front-rear direction. A distance between the third intersection point P3b and the fourth intersection point P4b is defined as a second distance D2b. Further, a distance between the first intersection point P1b and the third intersection point P3b is defined as a third distance D3b. Further, a distance between the first intersection point P1b and the fourth intersection point P4b is defined as D4b. Further, a distance between the second intersection point P2b and the third intersection point P3b is defined as D5b. Further, a distance between the second intersection point P2b and the fourth intersection point P4b is defined as D6b.

The first distance D1b in the present embodiment is equal to one-half of a length of a circumference of a cross-sectional circle of the shaft 21b, which is the measuring target object, in a state in which the sheet 13b is developed on a plane. Further, the second distance D2b is equal to one-half of the length of the circumference of the cross-sectional circle of the shaft 21b, which is the measuring target object, in a state in which the sheet 13b is developed on a plane. Further, the third distance D3b is equal to one-fourth of the length of the circumference of the cross-sectional circle of the shaft 21b, which is the measuring target object, in a state in which the sheet 13b is developed on a plane. Further, the fourth distance D4b is equal to three-fourths of the length of the circumference of the cross-sectional circle of the shaft 21b, which is the measuring target object, in a state in which the sheet 13b is developed on a plane. Further, the fifth distance D5b is equal to one-fourth of the length of the circumference of the cross-sectional circle of the shaft 21b, which is the measuring target object, in a state in which the sheet 13b is developed on a plane. Further, the sixth distance D6*b* is equal to one-fourth of the length of the circumference of the cross-sectional circle of the shaft 21*b*, which is the measuring target object, in a state in which the sheet 13*b* is developed on a plane.

As illustrated in FIGS. 10 and 11, the sensor unit 10*b* is attached to a circumference surface of the shaft 21*b*. Specifically, the rear main surface of the sheet 13*b* is fixed to the shaft 21*b* with the adhesion layer (not illustrated) provided on the rear main surface of the sheet 13*b*. As described above, the second distance D2*b* is equal to one-half of a length of the circumference of the cross-sectional circle of the shaft 21*b* in a state in which the sheet 13*b* is developed on a plane. As a result, the third center point CP3*b* of the third sensor portion 15*b* and the fourth center point CP4*b* of the fourth sensor portion 16*b* are disposed to be separated by 180 degrees in the peripheral direction DIRC of the shaft 21*b*. That is, as illustrated in FIG. 11, in a state in which the sensor unit 10*b* is attached to the shaft 21*b*, the third sensor portion 15*b* and the fourth sensor portion 16*b* are fixed to the shaft 21*b* such that the shaft 21*b* is disposed between the third sensor portion 15*b* and the fourth sensor portion 16*b* in the second direction DIR2. As a result, the third sensor portion 15*b* detects deformation of the shaft 21*b* in the second direction DIR2. Similarly, the fourth sensor portion 16*b* detects deformation of the shaft 21*b* in the second direction DIR2. In the present embodiment, the deformation of the shaft 21*b* detected by the third sensor portion 15*b* is deformation (bent) of the shaft 21*b* in the second direction DIR2, and the deformation of the shaft 21*b* detected by the fourth sensor portion 16*b* is deformation (bent) of the shaft 21*b* in the second direction DIR2.

As described above, the third distance D3*b* is equal to one-fourth of the length of the circumference of the cross-sectional circle of the shaft 21*b* in a state in which the sheet 13*b* is developed on a plane. As a result, the first center point CP1*b* of the first sensor portion 11*b* and the third center point CP3*b* of the third sensor portion 15*b* are disposed to be separated by 90 degrees in the peripheral direction DIRC of the shaft 21*b*. That is, the first direction DIR1 and the second direction DIR2 are directions that differ by 90 degrees when viewed in the third direction DIR3.

For example, when deformation occurs in the shaft 21*b* in the first direction DIR1, the piezoelectric film 113 generates a charge and the piezoelectric film 123 generates a charge according to the deformation of the shaft 21*b*. That is, the electric characteristics of the piezoelectric film 113 and the electric characteristics of the piezoelectric film 123 are changed according to deformation (first deformation) of the shaft 21*b*. Since the piezoelectric film 113 contracts in the up-down direction, a positive charge is generated, and since the piezoelectric film 123 expands in the up-down direction, a positive charge is generated. That is, a polarity of the charge generated by the piezoelectric film 113 and a polarity of the charge generated by the piezoelectric film 123 are the same.

However, when deformation occurs in the shaft 21*b* in the first direction DIR1, the piezoelectric film 153 generates no charge or very little charge, and the piezoelectric film 163 generates no charge or very little charge according to the deformation of the shaft 21*b*. That is, the electric characteristics of the piezoelectric film 153 and the electric characteristics of the piezoelectric film 163 are not changed or hardly changed according to the deformation (first deformation) of the shaft 21*b*.

For example, when deformation occurs in the shaft 21*b* in the second direction DIR2, the piezoelectric film 153 generates a charge and the piezoelectric film 163 generates a charge according to the deformation of the shaft 21*b*. That is, the electric characteristics of the piezoelectric film 153 and the electric characteristics of the piezoelectric film 163 are changed according to deformation (second deformation) of the shaft 21*b*. Since the piezoelectric film 153 expands in the up-down direction, a negative charge is generated, and since the piezoelectric film 163 contracts in the up-down direction, a negative charge is generated. That is, a polarity of the charge generated by the piezoelectric film 153 and a polarity of the charge generated by the piezoelectric film 163 are the same.

However, when deformation occurs in the shaft 21*b* in the second direction DIR2, the piezoelectric film 113 generates no charge or very little charge, and the piezoelectric film 123 generates no charge or very little charge according to the deformation of the shaft 21*b*. That is, the electric characteristics of the piezoelectric film 113 and the electric characteristics of the piezoelectric film 123 are not changed or hardly changed according to the deformation (second deformation) of the shaft 21*b*.

The same effects as those of the sensor unit 10 are obtained in the sensor unit 10*b* as described above. Further, the detection accuracy of the deformation of the shaft 21*b* in the first direction DIR1 can be improved, and the detection accuracy of the deformation of the shaft 21*b* in the second direction DIR2 different from the first direction DIR1 can be improved. More specifically, the cross section of the shaft 21*b* perpendicular to the third direction DIR3 has a circular shape. The third sensor portion 15*b* and the fourth sensor portion 16*b* are fixed to the shaft 21*b* such that the shaft 21*b* is disposed between the third sensor portion 15*b* and the fourth sensor portion 16*b* in the second direction DIR2 different from the first direction DIR1, in a state of being attached to the shaft 21*b*. The electric characteristics of the third sensor portion 15*b* and the electric characteristics of the fourth sensor portion 16*b* are changed according to the deformation of the shaft 21*b*. As a result, when the deformation (bent) occurs in the shaft 21*b* in the second direction DIR2, the piezoelectric film 153 contracts, the piezoelectric film 163 expands, and both the piezoelectric film 153 and the piezoelectric film 163 generate charges. Therefore, a potential of the detection signal of the third sensor portion 15*b* is changed, and a potential of the detection signal of the fourth sensor portion 16*b* is changed. As a result, the detection signal of the third sensor portion 15*b* and the detection signal of the fourth sensor portion 16*b* can be used to detect deformation of the shaft 21*b*. As a result, according to the sensor unit 10*b*, the detection accuracy of the deformation of the shaft 21*b* can be improved.

According to the sensor unit 10*b*, the detection signals of the third sensor portion 15*b* and the fourth sensor portion 16*b* are easily generated. More specifically, the uniaxial stretching axis OD3 of the piezoelectric film 153 (third piezoelectric body) forms an angle of 45 degrees clockwise with respect to the up-down direction and forms an angle of 45 degrees counterclockwise with respect to the left-right direction. The uniaxial stretching axis OD4 of the piezoelectric film 163 (fourth piezoelectric body) forms an angle of 45 degrees counterclockwise with respect to the up-down direction and forms an angle of 45 degrees clockwise with respect to the left-right direction. As a result, the uniaxial stretching axis OD3 of the piezoelectric film 153 (third piezoelectric body) forms an angle of 90 degrees clockwise with respect to the uniaxial stretching axis OD4 of the piezoelectric film 163 (fourth piezoelectric body) in a state in which the sheet 13 (first sheet) is developed on a plane.

As a result, when the deformation (bent) occurs in the shaft 21*b* in the second direction DIR2, the polarity of the charge generated by the piezoelectric film 153 and the polarity of the charge generated by the piezoelectric film 163 are the same. Therefore, the detection signal can be generated by adding the charge generated by the piezoelectric film 153 and the charge generated by the piezoelectric film 163. As a result, the detection signals of the third sensor portion 15*b* and the fourth sensor portion 16*b* are easily generated.

According to the sensor unit 10*b*, the sheet 17*b* (fourth sheet) electrically connects the fifth electrode 154*a* and the seventh electrode 164*a*. As a result, the detection signals of the third sensor portion 15*b* and the fourth sensor portion 16*b* can be generated by one charge amplifier 155 and one voltage amplifier circuit 156. As a result, a circuit configuration of the sensor unit 10*b* is simplified.

In the present embodiment, although the sheet 17*b* electrically connects the fifth electrode 154*a* and the seventh electrode 164*a*, the sheet 17*b* may electrically connect the sixth electrode 154*b* and the eighth electrode 164*b*.

Further, the sensor unit 10*b* may further include a sheet 17*e* having conductive properties, and the third sensor portion 15*b* and the fourth sensor portion 16*b* may be connected to each other with the sheet 17*e*. Specifically, the sheet 17*b* may connect the fifth electrode 154*a* and the seventh electrode 164*a*, and the sheet 17*e* may connect the sixth electrode 154*b* and the eighth electrode 164*b*. That is, the sheet 17*b* (fourth sheet) may electrically connect the fifth electrode 154*a* and the seventh electrode 164*a*, and the sheet 17*e* (fifth sheet) may electrically connect the sixth electrode 154*b* and the eighth electrode 164*b*.

Second Modification Example

Figure 12:
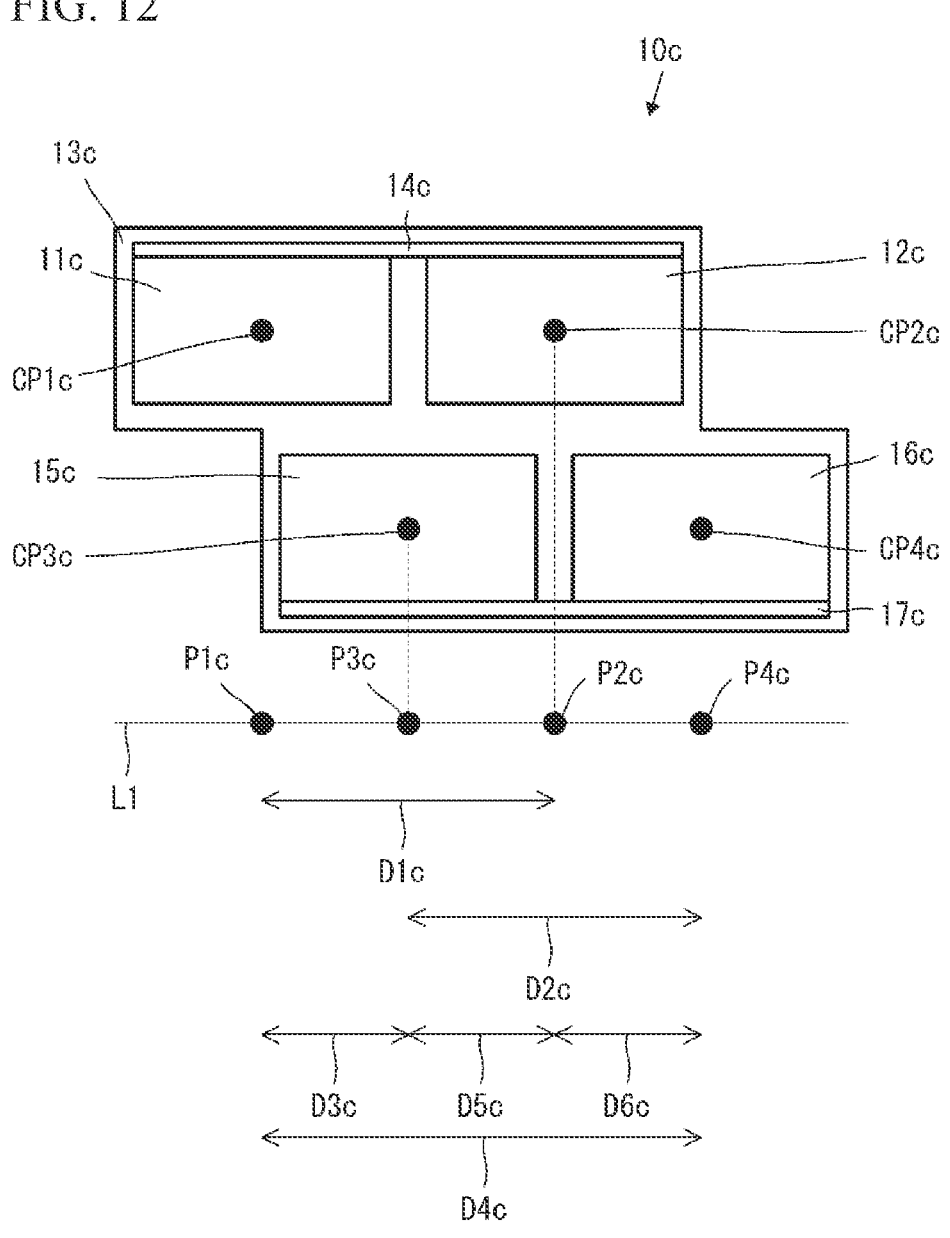
FIG. 12 is a plan view of a sensor unit 10*c* in a state in which a sheet 13*c* is developed on a plane according to a second modification example.
Figure 12:
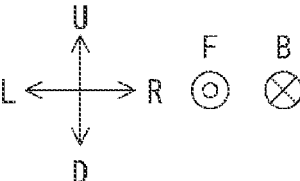

Hereinafter, a sensor unit 10*c* according to a second modification example of the present disclosure will be described with reference to the drawings. FIG. 12 is a plan view of the sensor unit 10*c* in a state in which a sheet 13*c* is developed on a plane according to the second modification example. As for the sensor unit 10*c* according to the second modification example, only a portion that is different from the disposition structure of the sensor unit 10*b* according to the second embodiment will be described, and the rest will be omitted.

As illustrated in FIG. 12, in a state in which the sheet 13*c* is developed on a plane, a first sensor portion 11*c* and a second sensor portion 12*c* are arranged in this order from left to right. In a state in which the sheet 13*c* is developed on the plane, a third sensor portion 15*c* and a fourth sensor portion 16*c* are arranged in this order from left to right. Further, a left part of the third sensor portion 15*c* is positioned below a right part of the first sensor portion 11*c*. A right part of the third sensor portion 15*c* is positioned below a left part of the second sensor portion 12*c*. A left part of the fourth sensor portion 16*c* is positioned below a right part of the second sensor portion 12*c*.

As illustrated in FIG. 12, in a state in which the sheet 13*c* is developed on a plane, the first sensor portion 11*c* includes a portion that overlaps the third sensor portion 15*c* when viewed in the up-down direction. Further, in a state in which the sheet 13*c* is developed on a plane, the second sensor portion 12*c* includes a portion that overlaps the third sensor portion 15*c* and the fourth sensor portion 16*c* when viewed in the up-down direction. Further, in a state in which the sheet 13*c* is developed on a plane, the third sensor portion 15*c* includes a portion that overlaps the first sensor portion 11*c* and the second sensor portion 12*c* when viewed in the up-down direction. Further, in a state in which the sheet 13*c* is developed on a plane, the fourth sensor portion 16*c* includes a portion that overlaps the second sensor portion 12*c* when viewed in the up-down direction.

The same effects as those of the sensor unit 10*b* are obtained in the sensor unit 10*c* as described above. Further, since an area of the front main surface and rear main surface of each of the first sensor portion 11*c*, second sensor portion 12*c*, third sensor portion 15*c*, and fourth sensor portion 16*c* can be increased, an area for detecting the charge of each of the first sensor portion 11*c*, the second sensor portion 12*c*, the third sensor portion 15*c*, and the fourth sensor portion 16*c* can be increased. As a result, fluctuations in voltages of detection signals of the first sensor portion 11*c* and the second sensor portion 12*c* are increased. Further, fluctuations in voltages of detection signals of the third sensor portion 15*c* and the fourth sensor portion 16*c* are increased. As a result, detection accuracy of the sensor unit 10*c* can be improved.

Third Embodiment

Figure 13:
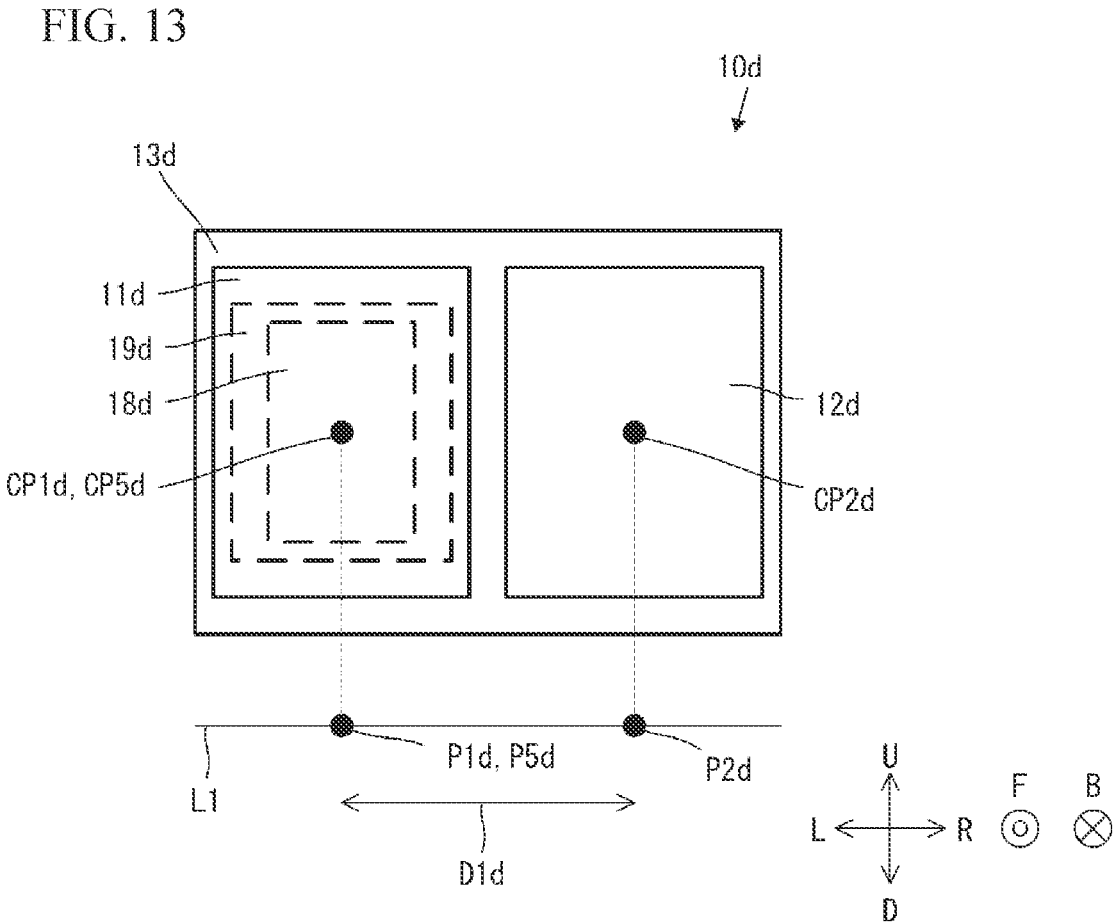
FIG. 13 is a plan view of a sensor unit 10*d* in a state in which a sheet 13*d* is developed on a plane according to a third embodiment.
Figure 14:
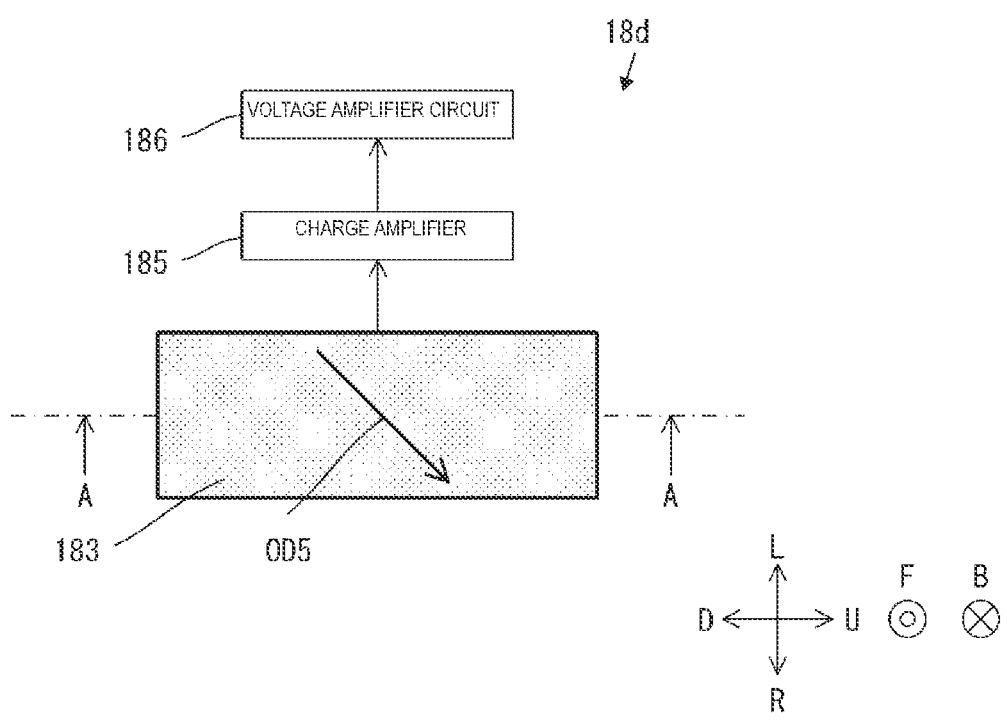
FIG. 14 includes a plan view and a cross-sectional view of a fifth sensor portion 18*d* in a state in which the sheet 13*d* is developed on a plane according to the third embodiment.
Figure 14:
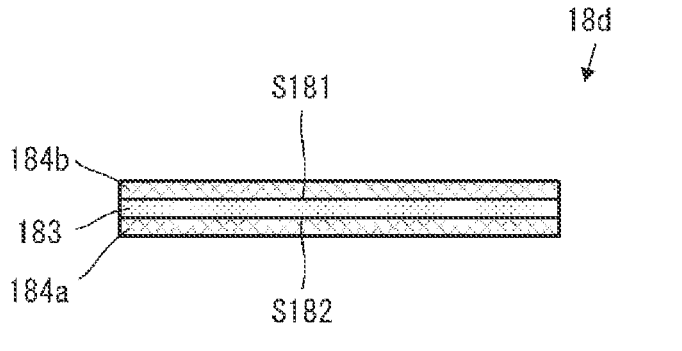
Figure 14:
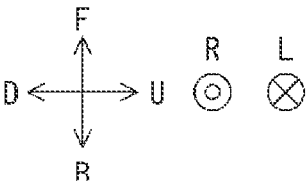
Figure 15:
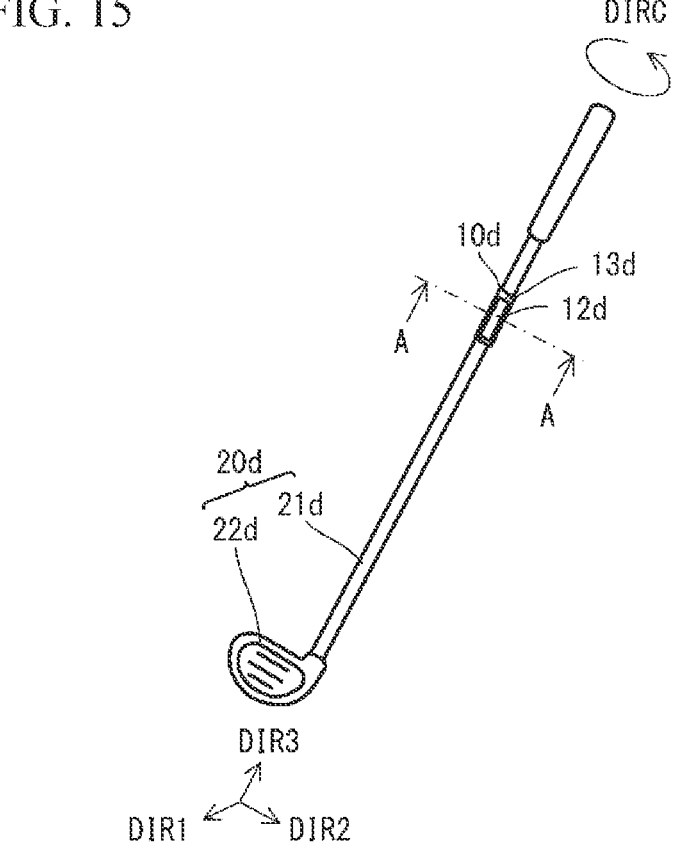
FIG. 15 is a perspective view in a state in which the sensor unit 10*d* is attached to a shaft 21*d* according to the third embodiment.
Figure 16:
FIG. 16 is a cross-sectional view taken along the line A-A in a state in which the sensor unit 10*d* is attached to the shaft 21*d* according to the third embodiment.
Figure 16:
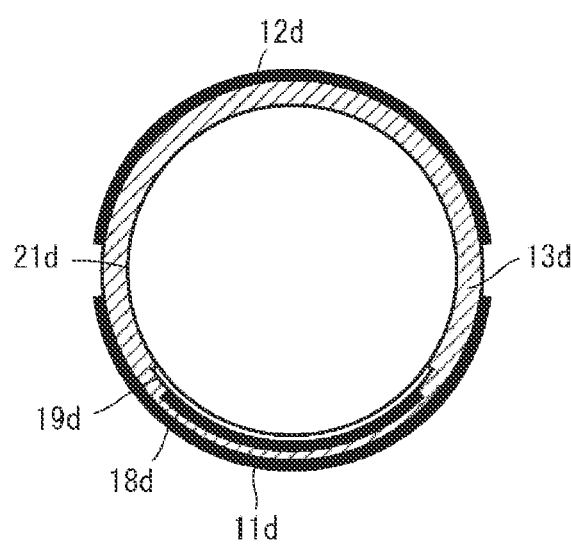

Hereinafter, a sensor unit 10*d* according to a third embodiment of the present disclosure will be described with reference to the drawings. FIG. 13 is a plan view of the sensor unit 10*d* in a state in which a sheet 13*d* is developed on a plane according to the third embodiment. FIG. 14 includes a plan view and a cross-sectional view of a fifth sensor portion 18*d* in a state in which the sheet 13*d* is developed on a plane according to the third embodiment. FIG. 15 is a perspective view in a state in which the sensor unit 10*d* is attached to a shaft 21*d* according to the third embodiment. FIG. 16 is a cross-sectional view taken along the line A-A in a state in which the sensor unit 10*d* is attached to the shaft 21*d* according to the third embodiment. As for the sensor unit 10*d* according to the third embodiment, only a portion that is different from the disposition structure of the sensor unit 10 according to the first embodiment will be described, and the rest will be omitted.

As illustrated in FIG. 13, the sensor unit 10*d* further includes the fifth sensor portion 18*d* and a sheet 19*d*. In a state in which the sheet 13*d* is developed on the plane, a first sensor portion 11*d* and the fifth sensor portion 18*d* are arranged in this order from front to rear.

The fifth sensor portion 18*d* detects deformation of the shaft 21*d*, which is the measuring target object, and has a film shape. However, a direction of deformation of the shaft 21*d*, which is the measuring target object, detected by the first sensor portion 11*d* and the second sensor portion 12*d*, and a direction of deformation of the shaft 21*d*, which is the measuring target object, detected by the fifth sensor portion 18*d* are the same direction. The fifth sensor portion 18*d* includes a front main surface and a rear main surface. Further, an area of the front main surface of the fifth sensor portion 18*d* is smaller than an area of a front main surface of the first sensor portion 11*d*.

As illustrated in FIG. 14, the fifth sensor portion 18*d* includes a piezoelectric film 183, a ninth electrode 184*a*, a tenth electrode 184*b*, a charge amplifier 185, and a voltage amplifier circuit 186.

The piezoelectric film 183 is an example of a piezoelectric body. The piezoelectric film 183 has a film shape. Therefore, the piezoelectric film 183 includes a front main surface S181 and a rear main surface S182. A main surface of the piezoelectric film 183 (fifth piezoelectric body) has a rectangular shape when viewed in a normal direction of a main surface of the sheet 13*d* (first sheet) in a state in which the piezoelectric film 183 (fifth piezoelectric body) is developed on a plane. In the present embodiment, in a state where the sheet 13d (first sheet) is developed on a plane, the front main surface S181 and rear main surface S182 of the piezoelectric film 183 (fifth piezoelectric body) have a rectangular shape with long sides extending in the up-down direction and short sides extending in the left-right direction when viewed in the front-rear direction. In the present embodiment, a longitudinal direction of the piezoelectric film 183 (fifth piezoelectric body) is the up-down direction, and a transverse direction of the piezoelectric film 183 (fifth piezoelectric body) is the left-right direction. In the present embodiment, the piezoelectric film 183 is a PLA film. The PLA film is the same as that in the first embodiment, and the description is omitted. In the present embodiment, a uniaxial stretching axis OD5 of the piezoelectric film 183 (fifth piezoelectric body) forms an angle of 45 degrees clockwise with respect to the up-down direction and forms an angle of 45 degrees counterclockwise with respect to the left-right direction. That is, the piezoelectric film 183 (fifth piezoelectric body) is stretched at least in a uniaxial direction. Further, the uniaxial stretching axis OD5 of the piezoelectric film 183 (fifth piezoelectric body) and the uniaxial stretching axis OD1 of the piezoelectric film 113 (first piezoelectric body) are in the same direction. Since the ninth electrode 184a, the tenth electrode 184b, the charge amplifier 185, and the voltage amplifier circuit 186 have the same structure as the first electrode 114a, the second electrode 114b, the charge amplifier 115, and the voltage amplifier circuit 116, the description thereof is omitted.

The fifth sensor portion 18d is attached to the sheet 19d (sixth sheet) with an adhesion layer (not illustrated) interposed therebetween. Specifically, the adhesion layer fixes the ninth electrode 184a and a front main surface of the sheet 19d. That is, the rear main surface of the fifth sensor portion 18d is fixed to the front main surface of the sheet 19d.

The fifth sensor portion 18d is attached to the sheet 13d with an adhesion layer (not illustrated) interposed therebetween. The adhesion layer has insulating properties. Specifically, the tenth electrode 184b and a rear main surface of the sheet 13d are fixed. That is, the front main surface of the fifth sensor portion 18d is fixed to the rear main surface of the sheet 13d.

The sheet 19d is a sheet that is attached to the shaft 21d which is the measuring target object. The sheet 19d (sixth sheet) has insulating properties. The sheet 19d includes a front main surface and a rear main surface. Shapes of the front main surface and rear main surface of the sheet 19d are rectangular shapes. The front main surface of the sheet 19d has a rectangular shape including a left short side that extends in the up-down direction, a right short side that extends in the up-down direction, an upper long side that extends in the left-right direction, and a lower long side that extends in the left-right direction. The rear main surface of the sheet 19d includes a left short side that extends in the up-down direction, a right short side that extends in the up-down direction, an upper long side that extends in the left-right direction, and a lower long side that extends in the left-right direction. Lengths of the upper long side and lower long side of the front main surface of the sheet 19d are shorter than lengths of the upper long side and lower long side of the front main surface of the sheet 13d. Further, lengths of the left short side and right short side of the front main surface of the sheet 19d are shorter than lengths of the left short side and right short side of the front main surface of the sheet 13d.

The sheet 19d (sixth sheet) is attached to the sheet 13d (first sheet) with an adhesion layer (not illustrated) interposed therebetween. More specifically, the adhesion layer has insulating properties. Specifically, the adhesion layer fixes a part of the front main surface of the sheet 19d and the rear main surface of the sheet 13d. A part of the front main surface of the sheet 19d is a portion where the front main surface of the sheet 19d and the front main surface of the fifth sensor portion 18d do not overlap and is a portion where the rear main surface of the sheet 13d and the front main surface of the sheet 19d overlap when viewed in the front-rear direction in a state in which the sheet 19d is developed on a plane. That is, a part of the front main surface of the sheet 19d is fixed to a part of the rear main surface of the sheet 13d.

As illustrated in FIG. 13, in a state in which the sheet 13d (first sheet) is developed on a plane, a left short side and right short side of the front main surface of the sheet 13d, a long side of the first sensor portion 11d (longitudinal direction of the first piezoelectric body), a long side of the second sensor portion 12d (longitudinal direction of the second piezoelectric body), and a long side of the fifth sensor portion 18d (longitudinal direction of the fifth piezoelectric body) are parallel to each other. Further, in a state in which the sheet 13d is developed on a plane, an upper long side and lower long side of the front main surface of the sheet 13d, a short side of the first sensor portion 11d, a short side of the second sensor portion 12d, and a short side of the fifth sensor portion 18d are parallel to each other.

As illustrated in FIG. 13, in a state in which the sheet 13d is developed on a plane, a fifth center point CP5d of the fifth sensor portion 18d is defined when viewed in the front-rear direction. Since the definition of the fifth center point CP5d conforms to the definition of the first center point CP1, the detailed description is omitted.

The first center point CP1d of the first sensor portion 11d and the fifth center point CP5d of the fifth sensor portion 18d in the present embodiment match each other. As a result, the front main surface of the fifth sensor portion 18d includes a portion that overlaps the front main surface of the first sensor portion 11d when viewed in the front-rear direction in a state in which the sheet 13d is developed on a plane.

As illustrated in FIGS. 15 and 16, the sensor unit 10d is attached to a circumference surface of the shaft 21d. Specifically, a part of the rear main surface of the sheet 13d and a part of the rear main surface of the sheet 19d are fixed to the shaft 21d with an adhesion layer (not illustrated) provided on the part of the rear main surface of the sheet 13d and the part of the rear main surface of the sheet 19d. In a state in which the sensor unit 10d is attached to the shaft 21d, the fifth sensor portion 18d is fixed to the shaft 21d to be disposed between the first sensor portion 11d and the shaft 21d in the first direction DIR1. As a result, the fifth sensor portion 18d detects deformation of the shaft 21d in the first direction DIR1, similar to the first sensor portion 11d and the second sensor portion 12d. In the present embodiment, the deformation of the shaft 21d detected by the first sensor portion 11d, the second sensor portion 12d, and the fifth sensor portion 18d is deformation (bent) of the shaft 21d in the first direction DIR1. Further, a polarity of charges generated by the piezoelectric film 183 of the fifth sensor portion 18d and a polarity of charges generated by the piezoelectric film 113 of the first sensor portion 11d and the piezoelectric film 123 of the second sensor portion 12d are equal to each other.

For example, when deformation occurs in the shaft 21d in the first direction DIR1, the piezoelectric film 113 generates a charge, the piezoelectric film 123 generates a charge, and the piezoelectric film 183 generates a charge according to the deformation of the shaft 21*d*. That is, electric characteristics of the piezoelectric film 113, electric characteristics of the piezoelectric film 123, and electric characteristics of the piezoelectric film 183 are changed according to the deformation of the shaft 21*d*. Further, since the piezoelectric film 113 contracts in the up-down direction, a positive charge is generated, since the piezoelectric film 123 expands in the up-down direction, a positive charge is generated, and since the piezoelectric film 183 contracts in the up-down direction, a positive charge is generated. That is, a polarity of the charge generated by the piezoelectric film 113, a polarity of the charge generated by the piezoelectric film 123, and a polarity of the charge generated by the piezoelectric film 183 are equal to each other.

However, when deformation occurs in the shaft 21*d* in the second direction DIR2, the piezoelectric film 113 generates no charge or very little charge, the piezoelectric film 123 generates no charge or very little charge, and the piezoelectric film 183 generates no charge or very little charge according to the deformation of the shaft 21*d*. That is, the electric characteristics of the piezoelectric film 113, the electric characteristics of the piezoelectric film 123, and the electric characteristics of the piezoelectric film 183 are not changed or hardly changed according to the deformation (second deformation) of the shaft 21*d*.

The same effects as those of the sensor unit 10 are obtained in the sensor unit 10*d* as described above. More specifically, the cross section of the shaft 21*d* perpendicular to the third direction DIR3 has a circular shape. The fifth sensor portion 18*d* is fixed to the shaft 21*d* to be disposed between the first sensor portion 11*d* and the shaft 21*d* in the first direction DIR1 in a state of being attached to the shaft 21*d*. The electric characteristics of the first sensor portion 11*d*, the electric characteristics of the second sensor portion 12*d*, and the electric characteristics of the fifth sensor portion 18*d* are changed according to the deformation of the shaft 21*d*. As a result, when the deformation (bent) occurs in the shaft 21*d* in the first direction DIR1, the piezoelectric film 113 and the piezoelectric film 183 contract, the piezoelectric film 123 expands, and the piezoelectric film 113, the piezoelectric film 123, and the piezoelectric film 183 generate charges. Therefore, a potential of a detection signal of the first sensor portion 11*d* and a potential of a detection signal of the second sensor portion 12*d* are changed, and a potential of a detection signal of the fifth sensor portion 18*d* is changed. As a result, the detection signal of the first sensor portion 11*d* and the detection signals of the second sensor portion 12*d* and the fifth sensor portion 18*d* can be used to detect the deformation of the shaft 21*d*. As a result, according to the sensor unit 10*d*, the detection accuracy of the deformation of the shaft 21*d* can be improved.

According to the sensor unit 10*d*, since an area of the front main surface of the fifth sensor portion 18*d* is smaller than an area of the front main surface of the first sensor portion 11*d*, the adhesion of the sensor unit 10*d* to the shaft 21*d* can be improved.

Other Embodiments

The sensor unit according to the present disclosure is not limited to the sensor units 10, 10*a* to 10*d*, and can be changed within a range of the gist thereof. Further, the configurations of the sensor units 10 and 10*a* to 10*d* may be combined in any manner.

In a state in which the sheets 13, 13*a* to 13*d* are developed on planes, each of the uniaxial stretching axis OD1 of the piezoelectric film 113, the uniaxial stretching axis OD3 of the piezoelectric film 153, and the uniaxial stretching axis OD5 of the piezoelectric film 183 is not limited to forming an angle of 45 degrees clockwise with respect to the up-down direction and an angle of 45 degrees counterclockwise with respect to the left-right direction and may form other angles. Further, each of the uniaxial stretching axis OD2 of the piezoelectric film 123 and the uniaxial stretching axis OD4 of the piezoelectric film 163 is not limited to forming an angle of 45 degrees counterclockwise with respect to the up-down direction and an angle of 45 degrees clockwise with respect to the left-right direction and may form other angles.

For example, in a state in which the sheets 13 and 13*a* to 13*d* (first sheet) are developed on planes, each of the uniaxial stretching axis OD1 of the piezoelectric film 113 (first piezoelectric body), the uniaxial stretching axis OD3 of the piezoelectric film 153 (third piezoelectric body), and the uniaxial stretching axis OD5 of the piezoelectric film 183 (fifth piezoelectric body) may from an angle of 45 degrees counterclockwise with respect to the up-down direction and form an angle of 45 degrees clockwise with respect to the left-right direction, and each of the uniaxial stretching axis OD2 of the piezoelectric film 123 (second piezoelectric body) and the uniaxial stretching axis OD4 of the piezoelectric film 163 (fourth piezoelectric body) may form an angle of 45 degrees clockwise with respect to the up-down direction and form an angle of 45 degrees counterclockwise with respect to the left-right direction. In this configuration, when deformations (bent) occur in the shafts 21 and 21*a* to 21*d* in the first direction DIR1, since the piezoelectric film 113 and the piezoelectric film 183 contract in the up-down direction, negative charges are generated, and since the piezoelectric film 123 expands in the up-down direction, a negative charge is generated. Further, when deformations (bent) occur in the shaft 21*b* and the shaft 21*c* in the second direction DIR2, since the piezoelectric film 153 expands in the up-down direction, a positive charge is generated, and since the piezoelectric film 163 contracts in the up-down direction, a positive charge is generated.

Each of the uniaxial stretching axis OD1 of the piezoelectric film 113 (first piezoelectric body) and the uniaxial stretching axis OD3 of the piezoelectric film 153 (third piezoelectric body) may form an angle of 90 degrees counterclockwise with respect to each of the uniaxial stretching axis OD2 of the piezoelectric film 123 (second piezoelectric body) and the uniaxial stretching axis OD4 of the piezoelectric film 163 (fourth piezoelectric body) in a state in which the sheets 13 and 13*a* to 13*d* (first sheet) are developed in a plane. The 90 degrees include, for example, an angle including substantially 90 degrees±10 degrees.

The front main surface of the fifth sensor portion 18*d* may include a portion that overlaps the front main surface of the second sensor portion 12*d* when viewed in the front-rear direction in a state in which the sheet 13*d* is developed on a plane, and the uniaxial stretching axis OD5 of the piezoelectric film 183 and the uniaxial stretching axis OD2 of the piezoelectric film 123 may be in the same direction.

Each of the first sensor portions 11 and 11*a* to 11*d*, the second sensor portions 12 and 12*a* to 12*d*, the third sensor portions 15*b* and 15*c*, the fourth sensor portions 16*b* and 16*c*, and the fifth sensor portion 18*d* may contain a material having other piezoelectric bodies. Further, each of the first sensor portions 11 and 11*a* to 11*d*, the second sensor portions 12 and 12*a* to 12*d*, the third sensor portions 15*b* and 15*c*, the fourth sensor portions 16b and 16c, and the fifth sensor portion 18d may contain a material that does not have piezoelectricity.

For example, each of the first sensor portions 11 and 11a to 11d, the second sensor portions 12 and 12a to 12d, the third sensor portions 15b and 15c, the fourth sensor portions 16b and 16c, and the fifth sensor portion 18d may have a piezoelectric constant of d31. Each of the first sensor portions 11 and 11a to 11d, the second sensor portions 12 and 12a to 12d, the third sensor portions 15b and 15c, the fourth sensor portions 16b and 16c, and the fifth sensor portion 18d having the piezoelectric constant of d31 is a polyvinylidene fluoride (PVDF) film, for example.

In the detection of the deformation of the measuring target object, a deformation amount itself may be detected.

The detection of the deformation of the measuring target object may be detection of bending of the measuring target object or detection of twist of the measuring target object.

For example, each of the first sensor portions 11 and 11a to 11d, the second sensor portions 12 and 12a to 12d, the third sensor portions 15b and 15c, the fourth sensor portions 16b and 16c, and the fifth sensor portion 18d may include a strain gauge.

Each of the characteristics of the first sensor portions 11 and 11a to 11d, the second sensor portions 12 and 12a to 12d, the third sensor portions 15b and 15c, the fourth sensor portions 16b and 16c, and the fifth sensor portion 18d, which are changed according to deformations of the shafts 21 and 21a to 21d, may be physical property values other than the electric characteristics. For example, each of the physical property values of the first sensor portions 11 and 11a to 11d, the second sensor portions 12 and 12a to 12d, the third sensor portions 15b and 15c, the fourth sensor portions 16b and 16c, and the fifth sensor portion 18d, which are changed according to deformations of the shafts 21 and 21a to 21d, may be mechanical characteristics, thermal characteristics, optical characteristics, and chemical characteristics.

The first electrode 114a may be provided on the front main surface S111, the second electrode 114b may be provided on the rear main surface S112, the third electrode 124a may be provided on the front main surface S121, and the fourth electrode 124b may be provided on the rear main surface S122. As a result, the second electrode 114b and the fourth electrode 124b may be electrically connected to each other.

Further, the fifth electrode 154a may be provided on the front main surface S151, the sixth electrode 154b may be provided on the rear main surface S152, the seventh electrode 164a may be provided on the front main surface S161, and the eighth electrode 164b may be provided on the rear main surface S162. As a result, the sixth electrode 154b and the eighth electrode 164b may be electrically connected to each other.

Further, the ninth electrode 184a may be provided on the front main surface S181, and the tenth electrode 184b may be provided on the rear main surface S182.

The ninth electrode 184a may be electrically connected to the first electrode 114a or the third electrode 124a. Further, the tenth electrode 184b may be electrically connected to the second electrode 114b or the fourth electrode 124b. As a result, the charge amplifier 185 and the voltage amplifier circuit 186 may be omitted.

Each of the first sensor portions 11 and 11a to 11d, the second sensor portions 12 and 12a to 12d, the third sensor portions 15b and 15c, the fourth sensor portions 16b and 16c, and the fifth sensor portion 18d may include a charge amplifier and a voltage amplifier circuit.

The second sensor portions 12 and 12a to 12d may include the charge amplifier 115 and the voltage amplifier circuit 116. Further, the fourth sensor portions 16b and 16c may include the charge amplifier 155 and the voltage amplifier circuit 156.

Each of the first sensor portions 11 and 11a to 11d, the second sensor portions 12 and 12a to 12d, the third sensor portions 15b and 15c, the fourth sensor portions 16b and 16c, and the fifth sensor portion 18d does not have a film shape.

Each of the first sensor portions 11 and 11a to 11d, the second sensor portions 12 and 12a to 12d, the third sensor portions 15b and 15c, the fourth sensor portions 16b and 16c, and the fifth sensor portion 18d may not be attached to the sheets 13, 13a to 13d, and sheet 19d. In this case, each of the front main surfaces or rear main surfaces of the first sensor portions 11 and 11a to 11d, the front main surfaces or rear main surfaces of the second sensor portions 12 and 12a to 12d, the front main surfaces or rear main surfaces of the third sensor portions 15b and 15c, and the front main surfaces or rear main surfaces of the fourth sensor portions 16b and 16c may be provided with an adhesion layer having insulating properties, and each of the first sensor portions 11 and 11a to 11d, the second sensor portions 12 and 12a to 12d, the third sensor portions 15b and 15c, and the fourth sensor portions 16b and 16c may be fixed to the shafts 21 and 21a to 21d or the fifth sensor portion 18d with an adhesion layer. Further, the front main surface or the rear main surface of the fifth sensor portion 18d may be provided with an adhesion layer having insulating properties, and the fifth sensor portion 18d may be fixed to the shaft 21d with the adhesion layer.

In a state in which the sheets 13 and 13a to 13d are developed on planes, each of the front main surfaces and rear main surfaces of the first sensor portions 11 and 11a to 11d, the front main surfaces and rear main surfaces of the second sensor portions 12 and 12a to 12d, the front main surfaces and rear main surfaces of the third sensor portions 15b and 15c, the front main surfaces and rear main surfaces of the fourth sensor portions 16b and 16c, and the front main surface and rear main surface of the fifth sensor portion 18d may have a rectangular shape with short sides extending in the up-down direction and long sides extending in the left-right direction when viewed in the front-rear direction.

The lengths of the upper long sides and lower long sides of the front main surfaces of the sheets 13 and 13a to 13d and lengths of the upper long sides and lower long sides of the rear main surfaces of the sheets 13 and 13a to 13d may each be longer than the lengths of circumferences of cross-sectional circles of the shafts 21 and 21a-21d in a state in which the sheets 13 and 13a to 13d are developed in a plane.

In a state in which the sensor units 10 and 10a to 10d are respectively attached to the shafts 21 and 21a to 21d, each of intersection points between any straight line that is orthogonal to the third direction DIR3 and the front main surfaces of the sheets 13 and 13a to 13d may be three or more when viewed in the third direction DIR3.

The lengths of the upper long sides and lower long sides of the front main surfaces of the sheets 13 and 13a to 13d and lengths of the upper long sides and lower long sides of the rear main surfaces of the sheets 13 and 13a to 13d may each be equal to the lengths of circumferences of cross-sectional circles of the shafts 21 and 21a-21d in a state in which the sheets 13 and 13a to 13d are developed in a plane.

Each of the front main surfaces and rear main surfaces of the sheets 13 and 13a to 13d and sheet 19d may not be a rectangular shape. The rectangular shape includes a rectangular form and a slightly deformed rectangle shape. The slightly deformed rectangle shape is, for example, a rectangular shape having chamfered corners. The shapes of the front main surfaces and rear main surfaces of the sheets 13 and 13*a* to 13*d* and sheet 19*d* may be shapes completely different from a rectangular shape.

Each of thicknesses of the sheets 13 and 13*a* to 13*d* and sheet 19*d* (distance between the front main surface and the rear main surface of each of the sheets 13 and 13*a* to 13*d* and sheet 19*d*) may be uniform or may not be uniform.

In a state in which the sheets 13 and 13*a* to 13*d* are developed on planes, each of the front main surfaces and rear main surfaces of the first sensor portions 11 and 11*a* to 11*d*, the front main surfaces and rear main surfaces of the second sensor portions 12 and 12*a* to 12*d*, the front main surfaces and rear main surfaces of the third sensor portions 15*b* and 15*c*, the front main surfaces and rear main surfaces of the fourth sensor portions 16*b* and 16*c*, and the front main surface and rear main surface of the fifth sensor portion 18*d* may not be a rectangular shape.

For example, in a state in which the sheets 13 and 13*a* to 13*d* are developed on planes, each of the front main surfaces and rear main surfaces of the first sensor portions 11 and 11*a* to 11*d*, the front main surfaces and rear main surfaces of the second sensor portions 12 and 12*a* to 12*d*, the front main surfaces and rear main surfaces of the third sensor portions 15*b* and 15*c*, the front main surfaces and rear main surfaces of the fourth sensor portions 16*b* and 16*c*, and the front main surface and rear main surface of the fifth sensor portion 18*d* may have an oval shape.

For example, in a state in which the sheets 13 and 13*a* to 13*d* are developed on planes, each of the front main surfaces and rear main surfaces of the first sensor portions 11 and 11*a* to 11*d*, the front main surfaces and rear main surfaces of the second sensor portions 12 and 12*a* to 12*d*, the front main surfaces and rear main surfaces of the third sensor portions 15*b* and 15*c*, the front main surfaces and rear main surfaces of the fourth sensor portions 16*b* and 16*c*, and the front main surface and rear main surface of the fifth sensor portion 18*d* may have a square shape.

In a state in which the sheets 13 and 13*a* to 13*d* are developed on planes, each of the positions of the first center points CP1, CP1*a*, CP1*b*, CP1*c*, and CP1*d* in the up-down direction, the positions of the second center points CP2, CP2*a*, CP2*b*, CP2*c*, and CP2*d* in the up-down direction, and the position of the fifth center point CP5*d* in the up-down direction may be different from each other. Further, in a state in which the sheets 13*b* and 13*c* are developed on planes, each of the positions of the first center points CP1*b* and CP1*c* in the up-down direction, the positions of the second center points CP2*b* and CP2*c* in the up-down direction, the positions of the third center points CP3*b* and CP3*c* in the up-down direction, and the positions of the fourth center points CP4*b* and CP4*c* in the up-down direction may be different from each other.

In a state in which the sheets 13 and 13*a* to 13*d* are developed on planes, the rear main surfaces of the first sensor portions 11 and 11*a* to 11*d* may respectively have portions that do not overlap the rear main surfaces of the second sensor portions 12 and 12*a* to 12*d* when viewed in the front-rear direction. Further, in a state in which the sheets 13*b* and 13*c* are developed on planes, the rear main surfaces of the third sensor portions 15*b* and 15*c* may respectively have portions that do not overlap the rear main surfaces of the fourth sensor portions 16*b* and 16*c*.

Further, in a state in which the sheet 13*d* is developed on a plane, the front main surface and rear main surface of the first sensor portion 11*d* may have a portion that does not overlap the front main surface and rear main surface of the fifth sensor portion 18*d*.

In a state in which the sensor units 10 and 10*a* to 10*d* are respectively attached to the shafts 21 and 21*a* to 21*d*, the first sensor portions 11 and 11*a* to 11*d*, the second sensor portions 12 and 12*a* to 12*d*, the third sensor portions 15*b* and 15*c*, and the fourth sensor portions 16*b* and 16*c* may respectively disposed between the shafts 21 and 21*a* to 21*d*, and the sheets 13 and 13*a* to 13*d*. In this case, each of the front main surfaces of the first sensor portions 11 and 11*a* to 11*d*, the front main surfaces of the second sensor portions 12 and 12*a* to 12*d*, the front main surfaces of the third sensor portions 15*b* and 15*c*, and the front main surfaces of the fourth sensor portions 16*b* and 16*c* may be provided with an adhesion layer having insulating properties, and each of the first sensor portions 11 and 11*a* to 11*d*, the second sensor portions 12 and 12*a* to 12*d*, the third sensor portions 15*b* and 15*c*, and the fourth sensor portions 16*b* and 16*c* may be fixed to the shafts 21 and 21*a* to 21*d* with an adhesion layer.

In a state in which the sensor unit 10*d* is attached to the shaft 21*d*, the first sensor portion 11*d* may be disposed between the fifth sensor portion 18*d* and the shaft 21*d*.

The front main surfaces of the first sensor portions 11*b* and 11*c* may respectively have portions that overlap the front main surfaces of the third sensor portions 15*b* and 15*c* or the front main surfaces of the fourth sensor portions 16*b* and 16*c* when viewed in the front-rear direction in a state in which the sheets 13*b* and 13*c* are developed in planes.

The front main surfaces of the second sensor portions 12*b* and 12*c* may respectively have portions that overlap the front main surfaces of the third sensor portions 15*b* and 15*c* or the front main surfaces of the fourth sensor portions 16*b* and 16*c* when viewed in the front-rear direction in a state in which the sheets 13*b* and 13*c* are developed in planes.

The sheet 19*d* may be attached to the first sensor portion 11*d* or the second sensor portion 12*d*.

An area of the front main surface of the fifth sensor portion 18*d* may be equal to or larger than an area of the front main surface of the first sensor portion 11*d*.

A cross section of the measuring target object perpendicular to the third direction DIR3 is not limited to a circle as long as the cross section has a point-symmetric shape. For example, the cross section of the measuring target object perpendicular to the third direction DIR3 may be an ellipse, a parallelogram, a rectangular form, or a regular even-numbered polygon.

A shape of the measuring target object may be a shape that does not extend in the third direction DIR3.

The measuring target object is not limited to a shaft. For example, the measuring target object may be a baseball bat, a tennis racket, or a robot arm.

The number of sensor portions may be three or more.

Two or more of the sensor units 10 and 10*a* to 10*d* may be laminated.

10, 10*a*, 10*b*, 10*c*, 10*d* sensor unit
11, 11*a*, 11*b*, 11*c*, lid first sensor portion
12, 12*a*, 12*b*, 12*c*, 12*d* second sensor portion
13, 13*a*, 13*b*, 13*c*, 13*d* sheet
14*a*, 14*b*, 14*e* sheet
15*b*, 15*c* third sensor portion
16*b*, 16*c* fourth sensor portion
17*b*, 17*e* sheet
18*d* fifth sensor portion
19*d* sheet
20, 20*a*, 20*b*, 20*c*, 20*d* golf club
21, 21*a*, 21*b*, 21*c*, 21*d* shaft

22 head
113, 123, 153, 163, 183 piezoelectric film
114*a* first electrode
114*b* second electrode
124*a* third electrode
124*b* fourth electrode
154*a* fifth electrode
154*b* sixth electrode
164*a* seventh electrode
164*b* eighth electrode
184*a* ninth electrode
184*b* tenth electrode
115, 155, 185 charge amplifier
116, 156, 186 voltage amplifier circuit
OD1, OD2, OD3, OD4, OD5 uniaxial stretching axis
S111, S121, S151, S161, S181 front main surface
S112, S122, S152, S162, S182 rear main surface
CP1, CP1*a*, CP1*b*, CP1*d* first center point
CP2, CP2*a*, CP2*b* second center point
CP3*b* third center point
CP4*b* fourth center point
CP5*d* fifth center point
P1, P1*b* first intersection point
P2, P2*b* second intersection point
P3*b* third intersection point
P4*b* fourth intersection point
D1, D1*b* first distance
D2*b* second distance
D3*b* third distance
D4*b* fourth distance
D5*b* fifth distance
D6*b* sixth distance

The invention claimed is:

1. A sensor unit that detects deformation of a measuring target object, the sensor unit comprising:
   a first sensor portion configured to detect deformation of the measuring target object;
   a second sensor portion configured to detect deformation of the measuring target object; and
   a first sheet, wherein the first sensor portion and the second sensor portion are attached to the first sheet,
   wherein the first sheet is attached to the measuring target object,
   wherein the first sensor portion and the second sensor portion are fixed to the measuring target object such that the measuring target object is between the first sensor portion and the second sensor portion in a first direction,
   and
   wherein a physical property value of the first sensor portion and a physical property value of the second sensor portion are changed according to a first deformation of the measuring target object,
   wherein the first sensor portion comprises a first piezoelectric body,
   and the second sensor portion comprises a second piezoelectric body,
   wherein the first piezoelectric body is a film that is stretched at least in a first uniaxial direction and that comprises polylactic acid, and
   where in the second piezoelectric body is a film that is stretched at least in a second uniaxial direction and that comprises polylactic acid,
   wherein a stretching axis of the first piezoelectric body forms an angle of 90 degrees clockwise or counterclockwise with respect to a stretching axis of the second piezoelectric body in a planar plan view of the sensor unit.

2. The sensor unit according to claim 1, wherein the first sensor portion has a film shape, and the second sensor portion has a film shape.

3. The sensor unit according to claim 1,
   wherein a main surface of the first piezoelectric body has a rectangular shape in a planar plan view of the sensor unit, and
   wherein a main surface of the second piezoelectric body has a rectangular shape in a planar plan view of the sensor unit.

4. The sensor unit according to claim 1,
   wherein a longitudinal direction of the first piezoelectric body is parallel to a longitudinal direction of the second piezoelectric body in the planar plan view,
   wherein the stretching axis of the first piezoelectric body forms an angle of 45 degrees clockwise with respect to the longitudinal direction of the first piezoelectric body in the planar plan view, and
   wherein the stretching axis of the second piezoelectric body forms an angle of 45 degrees counterclockwise with respect to the longitudinal direction of the second piezoelectric body in the planar plan view.

5. The sensor unit according to claim 1, further comprising:
   a second sheet that has conductive properties,
   wherein the first sheet has insulating properties,
   wherein the first piezoelectric body comprises a first piezoelectric body first main surface and a first piezoelectric body second main surface,
   wherein the second piezoelectric body comprises a second piezoelectric body first main surface and a second piezoelectric body second main surface,
   wherein the first sensor portion comprises a first electrode on the first piezoelectric body second main surface and a second electrode on the first piezoelectric body first main surface,
   wherein the second sensor portion comprises a third electrode on the second piezoelectric body second main surface and a fourth electrode on the second piezoelectric body first main surface,
   wherein the first electrode is fixed to the first sheet,
   wherein the third electrode is fixed to the first sheet, and
   wherein the second sheet electrically connects the first electrode and the third electrode.

6. The sensor unit according to claim 1, further comprising:
   a third sheet that has conductive properties,
   wherein the first sheet has insulating properties,
   wherein the first piezoelectric body comprises a first piezoelectric body first main surface and a first piezoelectric body second main surface,
   wherein the second piezoelectric body comprises a second piezoelectric body first main surface and a second piezoelectric body second main surface,
   wherein the first sensor portion comprises a first electrode on the first piezoelectric body second main surface and a second electrode on the first piezoelectric body first main surface,
   wherein the second sensor portion comprises a third electrode on the second piezoelectric body second main surface and a fourth electrode on the second piezoelectric body first main surface,
   wherein the first electrode is fixed to the first sheet,
   wherein the third electrode is fixed to the first sheet, and wherein the third sheet electrically connects the second electrode and the fourth electrode.

7. The sensor unit according to claim 1, wherein the first sheet has conductive properties, wherein the first piezoelectric body comprises a first piezoelectric body first main surface and a first piezoelectric body second main surface, wherein the second piezoelectric body comprises a second piezoelectric body first main surface and a second piezoelectric body second main surface, wherein the first sensor portion comprises a first electrode on the first piezoelectric body second main surface and a second electrode on the first piezoelectric body first main surface, wherein the second sensor portion comprises a third electrode on the second piezoelectric body second main surface and a fourth electrode on the second piezoelectric body first main surface, wherein the first electrode is fixed to the first sheet, wherein the third electrode is fixed to the first sheet, and wherein the first sheet electrically connects the first electrode and the third electrode.

8. The sensor unit according to claim 5, further comprising:
a third sensor portion configured to detect deformation of the measuring target object; and
a fourth sensor portion configured to detect deformation of the measuring target object,
wherein the third sensor portion and the fourth sensor portion are attached to the first sheet,
wherein the third sensor portion and the fourth sensor portion are fixed to the measuring target object such that the measuring target object is between the third sensor portion and the fourth sensor portion in a second direction,
wherein a physical property value of the third sensor portion and a physical property value of the fourth sensor portion are changed according to second deformation of the measuring target object,
wherein the third sensor portion has a film shape,
wherein the third sensor portion comprises a third piezoelectric body,
wherein the third piezoelectric body is a film that is stretched at least in a third uniaxial direction and that comprises polylactic acid,
wherein the fourth sensor portion has a film shape,
wherein the fourth sensor portion comprises a fourth piezoelectric body,
wherein the fourth piezoelectric body is a film that is stretched at least in a fourth uniaxial direction and that comprises polylactic acid,
wherein a stretching axis of the third piezoelectric body forms an angle of 90 degrees clockwise or 90 degrees counterclockwise with respect to a stretching axis of the fourth piezoelectric body in the planar plane view, and
wherein the first direction and the second direction are different from each other.

9. The sensor unit according to claim 8,
wherein a main surface of the third piezoelectric body has a rectangular shape in the planar plan view,
wherein a main surface of the fourth piezoelectric body has a rectangular shape in the planar plan view,
wherein a longitudinal direction of the third piezoelectric body is parallel to a longitudinal direction of the fourth piezoelectric body in the planar plan view,
wherein the stretching axis of the third piezoelectric body forms an angle of 45 degrees clockwise with respect to the longitudinal direction of the third piezoelectric body in the planar plan view, and wherein the stretching axis of the fourth piezoelectric body forms an angle of 45 degrees counterclockwise with respect to the longitudinal direction of the fourth piezoelectric body in the planar plan view.

10. The sensor unit according to claim 8, further comprising:
a fourth sheet that has conductive properties,
wherein the third piezoelectric body comprises a third piezoelectric body first main surface and a third piezoelectric body second main surface,
wherein the fourth piezoelectric body comprises a fourth piezoelectric body first main surface and a fourth piezoelectric body second main surface,
wherein the third sensor portion comprises a fifth electrode on the third piezoelectric body second main surface and a sixth electrode on the third piezoelectric body first main surface,
wherein the fourth sensor portion comprises a seventh electrode on the fourth piezoelectric body second main surface and an eighth electrode on the fourth piezoelectric body first main surface,
wherein the fifth electrode is fixed to the first sheet,
wherein the seventh electrode is fixed to the first sheet, and
wherein the fourth sheet electrically connects the fifth electrode and the seventh electrode.

11. The sensor unit according to claim 8, further comprising:
a fifth sheet that has conductive properties,
wherein the third piezoelectric body comprises a third piezoelectric body first main surface and a third piezoelectric body second main surface,
wherein the fourth piezoelectric body comprises a fourth piezoelectric body first main surface and a fourth piezoelectric body second main surface,
wherein the third sensor portion comprises a fifth electrode on the third piezoelectric body second main surface and a sixth electrode on the third piezoelectric body first main surface,
wherein the fourth sensor portion comprises a seventh electrode on the fourth piezoelectric body second main surface and an eighth electrode on the fourth piezoelectric body first main surface,
wherein the fifth electrode is fixed to the first sheet,
wherein the seventh electrode is fixed to the first sheet, and
wherein the fifth sheet electrically connects the sixth electrode and the eighth electrode.

12. The sensor unit according to claim 1, further comprising:
a fifth sensor portion configured to detect deformation of the measuring target object; and
a sixth sheet that has insulating properties,
wherein the first sheet has insulating properties,
wherein the sixth sheet is attached to the first sensor portion or the first sheet,
wherein the fifth sensor portion is attached to the sixth sheet,
wherein the fifth sensor portion is fixed to the measuring target object between the first sensor portion and the measuring target object in the first direction,
wherein a main surface of the fifth sensor portion comprises an overlapping region that overlaps with a main surface of the first sensor portion in a planar plan view of the sensor unit, wherein a physical property value of the fifth sensor portion is changed according to the first deformation, wherein the fifth sensor portion has a film shape, wherein the fifth sensor portion comprises a fifth piezoelectric body, wherein the fifth piezoelectric body is a film that is stretched at least in a fifth uniaxial direction and that comprises polylactic acid, wherein a main surface of the fifth piezoelectric body has a rectangular shape in the planar plan view, wherein a longitudinal direction of the fifth piezoelectric body is parallel to a longitudinal direction of the first piezoelectric body in the planar plan view, and wherein a stretching axis of the fifth piezoelectric body and a stretching axis of the first piezoelectric body are in the same direction in the planar plan view.

13. The sensor unit according to claim 12, wherein an area of the main surface of the fifth sensor portion is smaller than an area of the main surface of the first sensor portion.

14. The sensor unit according to claim 1, wherein a shape of the measuring target object extends in a third direction orthogonal to both the first direction and a second direction that is different from the first direction.

15. The sensor unit according to claim 1, wherein a cross section of the measuring target object, which is perpendicular to a third direction orthogonal to both the first direction and a second direction that is different from the first direction, has a point-symmetric shape.

16. The sensor unit according to claim 1, wherein the deformation of the measuring target object detected by the first sensor portion is a bending of the measuring target object, and wherein the deformation of the measuring target object detected by the second sensor portion is a bending of the measuring target object.

17. The sensor unit according to claim 1, wherein the first piezoelectric body contracts and the second piezoelectric body expands according to the first deformation.

* * * * *